US009378389B2

(12) United States Patent
Kantor et al.

(10) Patent No.: US 9,378,389 B2
(45) Date of Patent: Jun. 28, 2016

(54) SHARED ITEM ACCOUNT SELECTION

(75) Inventors: Arcadiy G. Kantor, Seattle, WA (US);
Jonathan A. Bockelman, Kirkland, WA (US); Jeffrey E. Steinbok, Redmond, WA (US); Sarah M. Filman, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/229,214

(22) Filed: Sep. 9, 2011

(65) Prior Publication Data
US 2013/0067594 A1 Mar. 14, 2013

(51) Int. Cl.
| | | |
|---|---|---|
| G06F 7/00 | (2006.01) | |
| G06F 21/62 | (2013.01) | |
| H04L 29/06 | (2006.01) | |
| G06Q 50/00 | (2012.01) | |
| H04L 29/08 | (2006.01) | |
| G06F 21/33 | (2013.01) | |
| G06F 17/30 | (2006.01) | |

(52) U.S. Cl.
CPC ...... *G06F 21/6218* (2013.01); *G06F 17/30887* (2013.01); *G06F 21/335* (2013.01); *G06Q 50/01* (2013.01); *H04L 63/0838* (2013.01); *H04L 63/101* (2013.01); *H04L 67/06* (2013.01); *G06F 2221/2141* (2013.01)

(58) Field of Classification Search
USPC ......... 726/8, 28; 705/3, 34, 40, 347; 709/205; 725/46
See application file for complete search history.

(56) References Cited

U.S. PATENT DOCUMENTS

| 4,421,997 A | 12/1983 | Forys |
| 5,825,352 A | 10/1998 | Bisset et al. |
| 5,856,822 A | 1/1999 | Du et al. |

(Continued)

FOREIGN PATENT DOCUMENTS

| CN | 201828476 | 5/2011 |
| CN | 2201903594 | 7/2011 |

(Continued)

OTHER PUBLICATIONS

BBC website, provided by Waybackmachine (http://web.archive.org/) from Sep. 7, 2010; hereinafter BBC.*

(Continued)

*Primary Examiner* — Joseph P Hirl
*Assistant Examiner* — Sayed Beheshti Shirazi
(74) *Attorney, Agent, or Firm* — Julie Kane Akhter; Doug Barker; Micky Minhas

(57) ABSTRACT

Techniques for sharing of items from online storage (e.g., cloud storage) are described herein. In at least some embodiments, sharing links can be configured as one-time sharing links that provide recipients with limited, one-time access to a shared item for the purpose of selecting or registering an account to use for subsequent access to the item. Recipients are able to select accounts they find most convenient for accessing a shared item without the owner/sharer of the item necessarily having contact information for those accounts or sending a link to the accounts. Selection of a one-time link initiates an authentication sequence that selectively provides an option to select a particular account. Once the one-time sharing link is redeemed, the one-time sharing link is invalidated for subsequent access to the item.

20 Claims, 15 Drawing Sheets

(56) References Cited

U.S. PATENT DOCUMENTS

| | | | |
|---|---|---|---|
| 5,943,043 A | 8/1999 | Furuhata et al. | |
| 6,008,636 A | 12/1999 | Miller et al. | |
| 6,021,495 A * | 2/2000 | Jain | H04L 63/08 709/225 |
| 6,091,406 A | 7/2000 | Kambara et al. | |
| 6,323,846 B1 | 11/2001 | Westerman et al. | |
| 6,360,254 B1 | 3/2002 | Linden et al. | |
| 6,377,936 B1 * | 4/2002 | Henrick | G06Q 30/02 705/14.69 |
| 6,542,936 B1 * | 4/2003 | Mayle | G06Q 10/107 709/203 |
| 6,671,406 B1 | 12/2003 | Anderson | |
| 6,741,237 B1 | 5/2004 | Benard et al. | |
| 6,856,259 B1 | 2/2005 | Sharp | |
| 6,959,362 B2 | 10/2005 | Wall et al. | |
| 6,977,646 B1 | 12/2005 | Hauck et al. | |
| 7,039,871 B2 | 5/2006 | Cronk | |
| 7,053,887 B2 | 5/2006 | Kraus et al. | |
| 7,174,649 B1 | 2/2007 | Harris | |
| 7,254,775 B2 | 8/2007 | Geaghan et al. | |
| 7,295,191 B2 | 11/2007 | Kraus et al. | |
| 7,362,313 B2 | 4/2008 | Geaghan et al. | |
| 7,375,454 B2 | 5/2008 | Takasaki | |
| 7,536,386 B2 | 5/2009 | Samji et al. | |
| 7,580,556 B2 | 8/2009 | Lee et al. | |
| 7,592,999 B2 | 9/2009 | Rosenberg et al. | |
| 7,619,618 B2 | 11/2009 | Westerman et al. | |
| 7,711,450 B2 | 5/2010 | Im et al. | |
| 7,725,014 B2 | 5/2010 | Lam et al. | |
| 7,728,821 B2 | 6/2010 | Hillis et al. | |
| 7,746,325 B2 | 6/2010 | Roberts | |
| 7,797,115 B2 | 9/2010 | Tasher et al. | |
| 7,812,828 B2 | 10/2010 | Westerman et al. | |
| 7,907,750 B2 | 3/2011 | Ariyur et al. | |
| 7,938,009 B2 | 5/2011 | Grant et al. | |
| 7,978,182 B2 | 7/2011 | Ording et al. | |
| 8,061,223 B2 | 11/2011 | Pan | |
| 8,217,909 B2 | 7/2012 | Young | |
| 8,311,513 B1 * | 11/2012 | Nasserbakht | G06Q 10/109 455/410 |
| 8,314,780 B2 | 11/2012 | Lin et al. | |
| 8,493,355 B2 | 7/2013 | Geaghan et al. | |
| 8,738,706 B1 | 5/2014 | Grieve et al. | |
| 8,825,597 B1 * | 9/2014 | Houston | H04L 67/06 707/610 |
| 2002/0147929 A1 | 10/2002 | Rose | |
| 2002/0156848 A1 * | 10/2002 | Grouse | G06Q 10/10 709/204 |
| 2002/0156897 A1 | 10/2002 | Chintalapati et al. | |
| 2003/0061520 A1 | 3/2003 | Zellers et al. | |
| 2003/0164820 A1 | 9/2003 | Kent | |
| 2003/0200465 A1 * | 10/2003 | Bhat | H04L 63/0815 726/8 |
| 2004/0207606 A1 | 10/2004 | Atwood et al. | |
| 2005/0012724 A1 | 1/2005 | Kent | |
| 2005/0063566 A1 | 3/2005 | Beek et al. | |
| 2005/0086296 A1 | 4/2005 | Chi et al. | |
| 2005/0195978 A1 | 9/2005 | Babic et al. | |
| 2006/0097991 A1 | 5/2006 | Hotelling et al. | |
| 2006/0175485 A1 | 8/2006 | Cramer | |
| 2006/0235803 A1 | 10/2006 | Romney | |
| 2006/0259957 A1 | 11/2006 | Tam et al. | |
| 2007/0081726 A1 | 4/2007 | Westerman et al. | |
| 2008/0041639 A1 | 2/2008 | Westerman et al. | |
| 2008/0062140 A1 | 3/2008 | Hotelling et al. | |
| 2008/0068229 A1 | 3/2008 | Chuang | |
| 2008/0109912 A1 | 5/2008 | Rivera | |
| 2008/0114882 A1 | 5/2008 | Christenson | |
| 2008/0134343 A1 * | 6/2008 | Pennington | G06F 21/31 726/28 |
| 2008/0150909 A1 | 6/2008 | North et al. | |
| 2008/0158185 A1 | 7/2008 | Westerman | |
| 2008/0180399 A1 | 7/2008 | Cheng | |
| 2008/0209329 A1 * | 8/2008 | DeFranco | G06Q 10/00 715/733 |
| 2008/0211778 A1 | 9/2008 | Ording et al. | |
| 2008/0211782 A1 | 9/2008 | Geaghan et al. | |
| 2008/0262920 A1 | 10/2008 | O'Neill et al. | |
| 2008/0278453 A1 | 11/2008 | Reynolds et al. | |
| 2008/0284899 A1 | 11/2008 | Haubmann et al. | |
| 2008/0309624 A1 | 12/2008 | Hotelling | |
| 2008/0309629 A1 | 12/2008 | Westerman et al. | |
| 2009/0009483 A1 | 1/2009 | Hotelling et al. | |
| 2009/0012940 A1 | 1/2009 | Ives et al. | |
| 2009/0046073 A1 | 2/2009 | Pennington et al. | |
| 2009/0096753 A1 | 4/2009 | Lim | |
| 2009/0141046 A1 | 6/2009 | Rathnam et al. | |
| 2009/0157206 A1 | 6/2009 | Weinberg et al. | |
| 2009/0160763 A1 | 6/2009 | Cauwels et al. | |
| 2009/0174679 A1 | 7/2009 | Westerman | |
| 2009/0214876 A1 | 8/2009 | Kano et al. | |
| 2009/0234876 A1 | 9/2009 | Schigel et al. | |
| 2009/0241701 A1 | 10/2009 | Pan | |
| 2009/0250268 A1 | 10/2009 | Staton et al. | |
| 2009/0251435 A1 | 10/2009 | Westerman et al. | |
| 2009/0267903 A1 | 10/2009 | Cady et al. | |
| 2009/0273584 A1 | 11/2009 | Staton et al. | |
| 2009/0300020 A1 * | 12/2009 | Chen | G06F 17/30233 |
| 2009/0303202 A1 | 12/2009 | Liu et al. | |
| 2009/0312009 A1 | 12/2009 | Fishel | |
| 2010/0010998 A1 | 1/2010 | Wagner | |
| 2010/0042682 A1 * | 2/2010 | Kaye | G11B 27/034 709/203 |
| 2010/0053099 A1 | 3/2010 | Vincent et al. | |
| 2010/0073318 A1 | 3/2010 | Hu et al. | |
| 2010/0088372 A1 * | 4/2010 | Shridhar | G06F 21/41 709/204 |
| 2010/0103118 A1 | 4/2010 | Townsend et al. | |
| 2010/0103121 A1 | 4/2010 | Kim et al. | |
| 2010/0121657 A1 * | 5/2010 | Rosenberger | G06Q 50/24 705/3 |
| 2010/0134429 A1 | 6/2010 | You et al. | |
| 2010/0192211 A1 | 7/2010 | Bono et al. | |
| 2010/0193258 A1 | 8/2010 | Simmons et al. | |
| 2010/0214233 A1 | 8/2010 | Lee | |
| 2010/0231508 A1 | 9/2010 | Cruz-Hernandez et al. | |
| 2010/0241711 A1 | 9/2010 | Ansari et al. | |
| 2010/0265827 A1 | 10/2010 | Horn et al. | |
| 2010/0277505 A1 | 11/2010 | Ludden et al. | |
| 2010/0302211 A1 | 12/2010 | Huang | |
| 2010/0309139 A1 | 12/2010 | Ng | |
| 2010/0315266 A1 | 12/2010 | Gunawardana et al. | |
| 2010/0315366 A1 | 12/2010 | Lee et al. | |
| 2010/0315372 A1 | 12/2010 | Ng | |
| 2011/0018822 A1 | 1/2011 | Lin et al. | |
| 2011/0022414 A1 | 1/2011 | Ge et al. | |
| 2011/0025629 A1 | 2/2011 | Grivna et al. | |
| 2011/0042126 A1 | 2/2011 | Spaid et al. | |
| 2011/0047590 A1 | 2/2011 | Carr et al. | |
| 2011/0050620 A1 | 3/2011 | Hristov | |
| 2011/0055062 A1 * | 3/2011 | Juntilla | G06Q 30/02 705/34 |
| 2011/0055912 A1 * | 3/2011 | Fusari | G06F 17/30893 726/8 |
| 2011/0080348 A1 | 4/2011 | Lin et al. | |
| 2011/0084929 A1 | 4/2011 | Chang et al. | |
| 2011/0106477 A1 | 5/2011 | Brunner | |
| 2011/0115709 A1 | 5/2011 | Cruz-Hernandez | |
| 2011/0126280 A1 * | 5/2011 | Asano | G06F 21/32 726/19 |
| 2011/0131633 A1 * | 6/2011 | MacAskill | G06F 21/6209 726/4 |
| 2011/0141054 A1 | 6/2011 | Wu | |
| 2011/0153463 A1 | 6/2011 | Lovelace | |
| 2011/0173547 A1 | 7/2011 | Lewis et al. | |
| 2011/0214148 A1 * | 9/2011 | Gossweiler | H04N 21/235 725/46 |
| 2011/0261005 A1 | 10/2011 | Joharapurkar et al. | |
| 2011/0267481 A1 | 11/2011 | Kagei | |
| 2011/0276396 A1 | 11/2011 | Rathod | |
| 2011/0289143 A1 * | 11/2011 | Polis | H04W 67/2833 709/203 |
| 2011/0298709 A1 | 12/2011 | Vaganov | |
| 2011/0298745 A1 | 12/2011 | Souchkov | |

(56) References Cited

U.S. PATENT DOCUMENTS

| | | | |
|---|---|---|---|
| 2011/0299734 | A1 | 12/2011 | Bodenmueller |
| 2011/0304577 | A1 | 12/2011 | Brown |
| 2011/0304590 | A1 | 12/2011 | Su et al. |
| 2011/0313996 | A1 | 12/2011 | Strauss et al. |
| 2011/0314101 | A1 | 12/2011 | Redmon et al. |
| 2011/0320380 | A1* | 12/2011 | Zahn .............. G06Q 30/0282 705/347 |
| 2012/0030624 | A1 | 2/2012 | Migos |
| 2012/0032891 | A1 | 2/2012 | Parivar |
| 2012/0065779 | A1 | 3/2012 | Yamaguchi et al. |
| 2012/0068957 | A1 | 3/2012 | Puskarich et al. |
| 2012/0075331 | A1 | 3/2012 | Mallick |
| 2012/0105334 | A1 | 5/2012 | Aumiller et al. |
| 2012/0117156 | A1* | 5/2012 | Anka .............. G06Q 10/101 709/205 |
| 2012/0124615 | A1* | 5/2012 | Lee .............. H04N 21/25875 725/30 |
| 2012/0131490 | A1 | 5/2012 | Lin et al. |
| 2012/0146956 | A1 | 6/2012 | Jenkinson |
| 2012/0185933 | A1* | 7/2012 | Belk .............. G06F 21/88 726/17 |
| 2012/0187956 | A1 | 7/2012 | Uzelac et al. |
| 2012/0188176 | A1 | 7/2012 | Uzelac et al. |
| 2012/0188197 | A1 | 7/2012 | Uzelac et al. |
| 2012/0191394 | A1 | 7/2012 | Uzelac et al. |
| 2012/0206377 | A1 | 8/2012 | Zhao et al. |
| 2012/0206380 | A1 | 8/2012 | Zhao et al. |
| 2012/0223894 | A1 | 9/2012 | Zhao et al. |
| 2012/0259773 | A1* | 10/2012 | Hoffman .............. G06Q 40/00 705/40 |
| 2012/0260158 | A1* | 10/2012 | Steelberg .............. G06Q 30/02 715/234 |
| 2012/0265841 | A1* | 10/2012 | Ross .............. H04L 67/18 709/217 |
| 2012/0268416 | A1 | 10/2012 | Pirogov et al. |
| 2012/0280934 | A1 | 11/2012 | Ha et al. |
| 2012/0317208 | A1* | 12/2012 | Sousa .............. G06Q 10/107 709/206 |
| 2012/0319992 | A1 | 12/2012 | Lee |
| 2012/0331108 | A1* | 12/2012 | Ferdowsi .............. H04L 67/06 709/219 |
| 2013/0016045 | A1 | 1/2013 | Zhao et al. |
| 2013/0063167 | A1 | 3/2013 | Jonsson |
| 2013/0066975 | A1 | 3/2013 | Kantor et al. |
| 2013/0067303 | A1* | 3/2013 | Kantor .............. G06F 17/30165 715/205 |
| 2013/0113751 | A1 | 5/2013 | Uzelac et al. |
| 2013/0197862 | A1 | 8/2013 | Uzelac et al. |
| 2013/0238129 | A1 | 9/2013 | Rose et al. |
| 2013/0345864 | A1 | 12/2013 | Park |

FOREIGN PATENT DOCUMENTS

| | | |
|---|---|---|
| CN | 202093112 | 12/2011 |
| CN | 101545938 | 1/2012 |
| CN | 202171626 | 3/2012 |
| CN | 202196126 | 4/2012 |
| CN | 102436334 | 5/2012 |
| CN | 101982783 | 7/2012 |
| DE | 19939159 | 3/2000 |
| EP | 2284654 | 2/2011 |
| JP | 2003303051 | 10/2003 |
| KR | 1020010019445 A | 3/2001 |
| KR | 20050003155 | 1/2005 |
| KR | 20050094359 | 9/2005 |
| KR | 1020070007963 A | 1/2007 |
| KR | 100763057 | 10/2007 |
| KR | 20080019949 | 3/2008 |
| KR | 20080066416 | 7/2008 |
| KR | 100941441 | 2/2010 |
| KR | 20100067178 | 6/2010 |
| KR | 20100077298 | 7/2010 |
| KR | 20100129015 | 12/2010 |
| KR | 20100135982 | 12/2010 |
| KR | 101007049 | 1/2011 |
| KR | 20110005946 | 1/2011 |
| KR | 20110011337 | 2/2011 |
| KR | 20110016349 | 2/2011 |
| KR | 101065014 | 9/2011 |
| WO | WO-2006042309 | 4/2006 |
| WO | WO-20130063042 | 5/2013 |

OTHER PUBLICATIONS

"Office Web Apps: Share a SkyDrive folder", Retrieved at <<http://explore.live.com/office-web-apps-skydrive-share-using>>, Retrieved Date: Aug. 8, 2011, pp. 2.

"MOSS User Permissions and 'Modify Shared Webpart' Link", retrieved from http://www.sharepointdev.net/sharepoint--general-question-answers-discussion/moss-user-permissions-modify-shared-webpart-link-13744.shtml on Aug. 8, 2011, 3 pages.

"Office Web Apps: Share filed on SkyDrive", retrieved from http://explore.live.com/office-web-apps-skydrive-share-files-using on Aug. 8, 2011, 1 page.

"Public or Private Articles", retrieved from <http://www.presspublisher.com/features/public-or-private-articles> on Aug. 8, 2011, 8 pages.

"Setting Sharing Permissions for Google Docs and Google Sites", retrieved from http://www.library.kent.edu/files/SMS_Google_Sharing_Permissions.pdf on Aug. 8, 2011, 8 pages.

"Share Office documents in SkyDrive", retrieved from http://office.microsoft.com/en-us/web-apps-help/share-office-documents-in-skydrive-HA101820121.aspx on Aug. 8, 2011, 3 pages.

"Shared Folder Permissions", retrieved from http://www.tech-faq.com/shared-folder-permissions.html on Aug. 8, 2011, 7 pages.

Li, Jianguo et al., "Role Based Access Control for Social Network Sites", Department of Computer Science, Sun Yat-sen University; retrieved from http://ieeexplore.ieee.org/stamp/stamp.jsp?arnumber=05420153, (Dec. 3-5, 2009), 6 pages.

"Non-Final Office Action", U.S. Appl. No. 13/229,121, (Jun. 7, 2013), 13 pages.

"International Search Report", Mailed Date: Feb. 27, 2013, Application No. PCT/US2012/053681, Filed Date: Sep. 4, 2012, pp. 11.

"Actuation Force of Touch Screen", *Solutions @ Mecmesin*, retrieved from <http://www.ArticleOnePartners.com/index/servefile?fileId=188971>,(Dec. 31, 2010),1 page.

"AO Touch Screen Tester", retrieved from <http://www.ao-cs.com/Projects/touch%20scree%20tester%20project.html>, (Dec. 31, 2010),1 page.

"Capacitive Touch Sensors—Application Fields, Technology Overview and Implementation Example", *Fujitsu Microelectronics Europe GmbH*; retrieved from http://www.fujitsu.com/downloads/MICRO/fme/articles/fujitsu-whitepaper-capacitive-touch-sensors.pdf on Jul. 20, 2011. (Jan. 12, 2010),12 pages.

"Final Office Action", U.S. Appl. No. 12/941,693, (Nov. 26, 2012), 22 Pages.

"Final Office Action", U.S. Appl. No. 13/229,121, (Nov. 21, 2013), 15 pages.

"Haptic-Actuator Controllers", retrieved from <http://www.maxim-ic.com/products/data_converters/touch-interface/haptic-actuator.cfm> on May 4, 2011, (2011),1 page.

"How to Use the Precision Touch Testing Tool", retrieved from <http://feishare.com/attachments/article/279/precision-touch-testing-tool-Windows8-hardware-certification.pdf>, (Apr. 15, 2012),10 pages.

"International Search Report", Application No. PCT/US2011/058855, (Nov. 1, 2011), 8 pages.

"Linearity Testing Solutions in Touch Panels", retrieved from <advantech.com/machine-automation/.../%7BD05BC586-74DD-4BFA-B81A-2A9F7ED489F/>, (Nov. 15, 2011), 2 pages.

"MAX11871", retrieved from <http://www.maxim-ic.com/datasheet/index.mvp/id/7203> on May 4, 2011, (Mar. 25, 2011), 2 pages.

"MicroNav Integration Guide Version 3.0", retrieved from <http://www.steadlands.com/data/interlink/micronavintguide.pdf>, (Dec. 31, 2003),11 pages.

(56) References Cited

OTHER PUBLICATIONS

"Microsoft Windows Simulator Touch Emulation", retrieved from <blogs.msdn.com/b/visualstudio/archive/2011/09/30/microsoft-windows-simulator-touch-emulation.aspx>, (Sep. 30, 2011), 3 pages.
"Non-Final Office Action", U.S. Appl. No. 12/941,693, (May 16, 2013),13 pages.
"Non-Final Office Action", U.S. Appl. No. 12/941,693, (Jul. 18, 2012),19 pages.
"Non-Final Office Action", U.S. Appl. No. 13/152,991, (Mar. 21, 2013),10 pages.
"Non-Final Office Action", U.S. Appl. No. 13/183,377, (Jun. 21, 2013),10 pages.
"Non-Final Office Action", U.S. Appl. No. 13/228,283, (Aug. 27, 2013),12 pages.
"Non-Final Office Action", U.S. Appl. No. 13/293,060, (Jul. 12, 2013), 9 pages.
"OptoFidelity Touch & Test", retrieved from <http://www.ArticleOnePartners.com/index/servefile?fileId=188969, (Feb. 20, 2012),2 pages.
"OptoFidelity Touch and Test", retrieved from <http://www.ArticleOnePartners.com/index/servefile?fileId=188420>,(May 4, 2012),2 pages.
"OptoFidelity Two Fingers—robot", video available at <http://www.youtube.com/watch?v=YppRASbXHfk&feature=player_embedded#?section>, (Sep. 15, 2010),2 pages.
"PCT Search Report and Written Opinion", Application No. PCT/US2011/055621, (Jun. 13, 2012), 8 pages.
"PCT Search Report and Written Opinion", Application No. PCT/US2012/027642, (Sep. 3, 2012), 9 pages.
"PCT Search Report and Written Opinion", Application No. PCT/US2012/024780, (Sep. 3, 2012), 9 pages.
"PCT Search Report Written Opinion", Application No. PCT/US2012/024781, and (Sep. 3, 2012), 9 pages.
"PCT Search Report and Written Opinion", Application No. PCT/US2013/021787, (May 13, 2013), 9 pages.
"Projected Capacitive Test Fixture", retrieved from <http://www.touch-intl.com/downloads/DataSheets%20for%20Web/6500443-PCT-DataSheet-Web.pdf>, (2009), 2 pages.
"Resistive Touch Screen_Resistance Linearirt Test", video available at <http://www.youtube.com/watch?v=hb23GpQdXXU>, (Jun. 17, 2008), 2 pages.
"Smartphone Automatic Testing Robot at UEI Booth" video available at <http://www.youtube.com/watch?v=f-Q4ns-b9sA>, (May 9, 2012), 2 pages.
"STM23S-2AN NEMA 23 Integrated Drive+Motor", Retrieved from: <http://www.applied-motion.com/products/integrated-steppers/stm23s-2an> on Jan. 24, 2012, (Jan. 24, 2010), 3 pages.
"Technology Comparison: Surface Acoustic Wave, Optical and Bending Wave Technology", *3M Touch Systems*, Available at >http://multimedia.3m.com/mws/mediawebserver?mwsId=66666UuZjcFSLXTtnXT2NXTaEVuQEcuZgVs6EVs6E666666--&fn=DST-Optical-SAW%20Tech%20Brief.pdf>,(2009), pp. 1-4.
"Touch Panel Inspection & Testing Solution", retrieved from <http://www.ArticleOnePartners.com/index/servefile?fileId=188967>, (Dec. 31, 2010), 1 page.
"Touch Panel Semi-Auto Handler Model 3810", retrieved from <htpp://www.chromaus.com/datasheet/3810_en.pdf>, (Dec. 31, 2010), 2 pages.
"TouchSense Systems Immersion", retrieved from <http://www.ArticleOnePartners.com/index/servefile?fileId=188486 >, (Jun. 19, 2010), 20 pages.
"Using Low Power Mode on the MPR083 and MPR084", *Freescale Semiconductor Application Note*, Available at <http://cache.freescale.com/files/sensors/doc/app_note/AN3583.pdf>,(Nov. 2007), pp. 1-5.
Asif, Muhammad et al., "MPEG-7 Motion Descriptor Ectraction for Panning Camera Using Sprite Generated", in *Proceedings of AVSS 2008*, Available at <http://ieeexplore.ieee.org/stamp/stamp.jsp?tp=&arnumber=4730384>,(Sep. 2008), pp. 60-66.
Baraldi, Stefano et al., "WikiTable: Finger Driven Interaction for Collaborative Knowledge-Building Workspaces", *Proceedings of the 2006 Conference on Computer Vision and Pattern Recognition Workshop (CVPRW '06)*, available at <<http://ieeexplore.ieee.org/stamp/stamp.jsp?tp=&arnumber=1640590>>,(Jul. 2006), 6 pages.
Benko, Hrvoje et al., "Resolving Merged Touch Contacts", U.S. Appl. No. 12/914,693, filed Nov. 8, 2010, 22 pages.
Binns, Francis S., "Multi-"Touch" Interaction via Visual Tracking", *Bachelor of Science in Computer Science with Honours, The University of Bath*, available at <<http://www.cs.bath.ac.uk/~mdv/courses/CM30082/projects.bho/2008-9/Binns-FS-dissertation-2008-9.pdf>>,(May 2009), 81 pages.
Brodkin, Jon "Windows 8 hardware: Touchscreens, sensor supoort and robotic fingers", <<http://arstechnica.com/business/news/2011/09/windows-8-hardware-touch-screens-sensor-support-and-robotic-fingers.ars>>, (Sep. 13, 2011), 1 Page.
Buffet, Y "Robot Touchscreen Analysis", <<http://ybuffet.posterous.com/labsmotocom-blog-archive-robot-touchscreen-an>>, (Apr. 19, 2010), 2 Pages.
Cao, Xiang et al., "Evaluation of an On-line Adaptive Gesture Interface with Command Prediction", in *Proceedings of GI 2005*, Available at <http://citeseerx.ist.psu.edu/viewdoc/download;jsessionid=DAB1B08F620C23464427932BAF1ECF49?doi=10.1.1.61.6749&rep=rep1&type=pdf>(May 2005), 8 pages.
Cao, Xiang et al., "ShapeTouch: Leveraging Contact Shape on Interactive Surfaces", In *Proceedings of TABLETOP 2008*, Available at <http://www.cs.toronto.edu/~caox/tabletop2008_shapetouch.pdf>,(2008), pp. 139-146.
Cravotta, Robert "The Battle for Multi-touch", *Embedded Insights*, retrieved from <http://www.embeddedinsights.com/channels/2011/04/12/the-battle-for-multi-touch/> on May 4, 2011,(Apr. 12, 2011), 3 pages.
Dang, Chi T., et al., "Hand Distinction for Multi-Touch Tabletop Interaction", *University of Augsburg; Institute of Computer Science; Proceedings of the ACM International Conference on Interactive Tabletops and Surfaces*, (Nov. 23-25, 2009), 8 pages.
Dillencourt, Michael B., et al., "A General Approach to Connected-Component Labeling for Arbitrary Image Representations", *Journal of the Association for Computing Machinery*, vol. 39, No. 2, available at <<http://www.cs.umd.edu/~hjs/pubs/DillJACM92.pdf>>,(Apr. 1992), pp. 253-280.
Dillow, Clay "Liquid-Filled Robot Finger More Sensitive to Touch Than a Human's", retrieved from <www.popsci.com/technology/article/2012-06/new-robot-finger-more-sensitive-touch-human> on Jul. 27, 2012, (Jun. 19, 2012), 2 pages.
Hoggan, Eve et al., "Mobile Multi-Actuator Tactile Displays", in *2nd international conference on Haptic and audio interaction design*, retrieved from <http://www.dcs.gla.ac.uk/~stephen/papers/HAID2.pdf>,(Oct. 29, 2007),12 pages.
Hoshino, et al., "Pinching at finger tips for humanoid robot hand", Retrieved at <<http://web.mit.edu/zoz/Public/HoshinoKawabushiRobotHand.pdf>>, (Jun. 30, 2005), 9 Pages.
Khandkar, Shahedul H., et al., "Tool Support for Testing Complex MultiTouch Gestures", *ITS 2010*, Nov. 7-10, 2010, Saarbrucken, Germany, (Nov. 7, 2010), 10 pages.
Kjellgren, Olof "Developing a remote control application for Windows CE", *Bachelor Thesis performed in Computer Engineering at ABE Robotics, Miilardalen University, Department of Computer Science and Electronics*, Retrieved at <<http://www.idt.mdh.se/utbildning/exjobblfiles/TR0661.pdf>>,(May 30, 2007), 43 Pages.
Kuosmanen, Hans "OptoFidelity Automating UI Testing", video available at <http://www.youtube.com/watch?v=mOZ2r7ZvyTg&feature=player_embedded#!section>, (Oct. 14, 2010), 2 pages.
Kuosmanen, Hans "Testing the Performance of Touch-Enabled Smartphone User Interfaces", retrieved from <http://www.ArticleOnePartners.com/index/servefile?fileId=188442>, (Dec. 31, 2008), 2 pages.
Levin, Michael et al., "Tactile-Feedback Solutions for an Enhanced User Experience", retrieved from >http://www.pbinterfaces.com/documents/Tactile_Feedback_Solutions.pdf>, (Oct. 31, 2009), pp. 18-21.
McGlaun, Shane "Microsoft's Surface 2.0 Stress Testing Robot Called Patty Shown off for First Time", Retrieved at <<http://www

(56) References Cited

OTHER PUBLICATIONS

.slashgear. com/microsofts-surface.2 -0-stress-testing-robot-called-patty-shown-off -for -first-time-19172971/>>, (Aug. 19, 2011), 1 Page.
McMahan, William et al., "Haptic Display of Realistic Tool Contact via Dynamically Compensated Control of a Dedicated Actuator", *International Conference on Intelligent Robots and Systems*, St. Louis, MO, Oct. 11-15, 2009, retrieved from <http://repository.upenn.edu/meam_papers/222>,(Dec. 15, 2009), 9 pages.
Pratt, Susan "Factors Affecting Sensor Response", *Analog Devices, AN830 Application Note*, Available at <http://www.analog.com/static-imported-files/application_notes/5295737729138218742AN830_0.pdf>,(Dec. 2005), pp. 1-8.
Takeuchi, et al., "Development of a Multi-fingered Robot Hand with Softness changeable Skin Mechanism", *International Symposium on and 2010 6th German Conference on Robotics (ROBOTIK)*, Retrieved at <<http://ieeexplore.ieee.org/stamp/stamp.jsp?arnumber=05756853>>,(Jun. 7, 2010), 7 Pages.
Tao, Yufei et al., "An Efficient Cost Model for Optimization of Nearest Neighbor Search in Low and Medium Dimensional Spaces", *Knowledge and Data Engineering*, vol. 16 Issue:10, retrieved from <<http://www.cais.ntu.edu.sg/~jzhang/papers/ecmonns.pdf>> on Mar. 16, 2011,(Oct. 2004),16 pages.
Terpstra, Brett "BetterTouchTool Makes Multi-touch Infinitely More Useful, for Free", retrieved from <http://www.tuaw.com/2010/01/05/bettertouchtool-makes-multi-touch-infinitely-more-useful-for-fr/> on Jul. 20, 2012, (Jan. 5, 2010), 4 pages.
Toto, Serkan "Video: Smartphone Test Robot Simulates Countless Flicking and Tapping", retrieved from <techcrunch.com/2010/12/21/video-smartphone-test-robot-simulates-countless-flicking-and-tapping/>, (Dec. 21, 2010), 2 pages.
Tsuchiya, Sho et al., "Vib-Touch: Virtual Active Touch Interface for Handheld Devices", in *Proceedings of The 18th IEEE International Symposium on Robot and Human Interactive Communication*, Available at <http://www.mech.nagoya-u.ac.jp/asi/en/member/shogo_okamoto/papers/tsuchiyaROMAN2009.pdf>,(Oct. 2009), pp. 12-17.
Westman, Tapani et al., "Color Segmentation by Hierarchical Connected Components Analysis with Image Enhancement by Symmetric Neighborhood Filter", *Pattern Recognition, 1990. Proceedings., 10th International Conference on Jun. 16-21, 1990*, retrieved from <<http://ieeexplore.ieee.org/stamp/stamp.jsp?tp=&arnumber=118219>> on Mar. 16, 2011,(Jun. 16, 1990), pp. 796-802.
Wilson, Andrew D., "TouchLight: An Imaging Touch Screen and Display for Gesture-Based Interaction", in *Proceedings of ICIM 2004*, Available at <http://citeseerx.ist.psu.edu/viewdoc/download-?doi=10.1 .195.3647&rep=rep1&type=pdf>,(Oct. 2004), 8 pages.
Wimmer, Raphael et al., "Modular and Deformable Touch-Sensitive Surface Based on Time Domain Reflectometry", in *Proceedings of UIST 2011*, Available at <http://www.medien.ifi.lmu.de/pubdb/publications/pub/wimmer2011tdrTouch/wimmer2011tdrTouch.pdf>,(Oct. 2011),10 pages.
"Input Testing Tool", U.S. Appl. No. 13/659,777, filed Oct. 24, 2012,45 pages.
"PCT Search Report and Written Opinion", Application No. PCT/US2013/053621, (Feb. 20, 2013),10 pages.
"Touch Quality Test Robot'", U.S. Appl. No. 13/530,692, (Jun. 22, 2012),40 pages.
Kastelan, et al., "Stimulation Board for Automated Verification of Touchscreen-Based Devices", *22nd International Conference of Field Programmable Logic and Applications*, Available at <https://www2.lirmm.fr/lirmm/interne/BIBLI/CDROM/MIC/201/FPL_2012/Papers/PHD7.pdf>,(Aug. 29, 2012),2 pages.
Kastelan, et al., "Touch-Screen Stimulation for Automated Verification of Touchscreen-Based Devices", in *IEEE 19th International Conference and Workshops on Engineering of Computer Based Systems*, (Apr. 11, 2012),pp. 52-55.
Zivkov, et al., "Touch Screen Mobile Application as Part of Testing and Verification System", *Proceedings of the 35th International Convention*, (May 21, 2012),pp. 892-895.
"Final Office Action", U.S. Appl. No. 13/293,060, Sep. 25, 2013, 10 pages.
"Non-Final Office Action", U.S. Appl. No. 13/293,060, Nov. 29, 2013, 11 pages.
"Non-Final Office Action", U.S. Appl. No. 13/156,243, Sep. 19, 2013, 12 pages.
"Final Office Action", U.S. Appl. No. 13/183,377, Oct. 15, 2013, 12 pages.
"International Search Report and Written Opinion", Application No. PCT/US2013/046208, Sep. 27, 2013, 12 pages.
"Non-Final Office Action", U.S. Appl. No. 13/099,288, Feb. 6, 2014, 13 pages.
"Non-Final Office Action", U.S. Appl. No. 13/198,036, Jan. 31, 2014, 14 pages.
"Final Office Action", U.S. Appl. No. 13/152,991, Sep. 20, 2013, 14 pages.
"Non-Final Office Action", U.S. Appl. No. 13/154,161, Jan. 3, 2014, 14 pages.
"Non-Final Office Action", U.S. Appl. No. 12/941,693, Nov. 18, 2013, 21 Pages.
"Notice of Allowance", U.S. Appl. No. 13/156,243, Jan. 28, 2014, 8 pages.
"Notice of Allowance", U.S. Appl. No. 13/198,415, Dec. 26, 2013, 8 pages.
"Final Office Action", U.S. Appl. No. 13/228,283, Mar. 7, 2014, 12 pages.
"Final Office Action", U.S. Appl. No. 13/530,692, Apr. 10, 2014, 16 pages.
"International Search Report and Written Opinion", Application No. PCT/US2013/061067, Feb. 7, 2014, 11 pages.
"Non-Final Office Action", U.S. Appl. No. 13/530,692, Jan. 31, 2014, 14 pages.
"Advisory Action", U.S. Appl. No. 13/228,283, Jul. 9, 2014, 3 pages.
"Foreign Office Action", CN Application No. 201210331655.8, Jan. 7, 2015, 14 pages.
"Lightning Fairy DIY One's Own HTTP File Server", Computer Technology—HELLO-IT; No. 5, U.S. Appl. No. 13/228,283, filed May 31, 2004, 2 pages.
"Non-Final Office Action", U.S. Appl. No. 13/228,283, Dec. 23, 2014, 14 pages.
"Non-Final Office Action", U.S. Appl. No. 13/229,121, Oct. 6, 2014, 12 pages.
"Final Office Action", U.S. Appl. No. 13/229,121, May 20, 2015, 16 pages.
Morgan,"Reducing Internet Traffic by Packaging Multiple HTTP Requests", Retrieved from <http://web.archive.org/web/20110122075632/http://usabilityetc.com/articles/http-packages/> on May 20, 2015, Jan. 22, 2011, 2 pages.
"Foreign Office Action", CN Application No. 201210331725.X, Feb. 4, 2015, 12 pages.
"Extended European Search Report", EP Application No. 12829938.5, Mar. 19, 2015, 5 pages.
"Extended European Search Report", EP Application No. 12829709.0, Mar. 20, 2015, 5 pages.
"Final Office Action", U.S. Appl. No. 13/228,283, Aug. 5, 2015, 18 pages.
"Foreign Office Action", CN Application No. 201210331655.8, Sep. 29, 2015, 8 pages.
"Non-Final Office Action", U.S. Appl. No. 13/229,121, Dec. 24, 2015, 15 pages.
"Foreign Office Action", CN Application No. 201210331725.X, Nov. 4, 2015, 7 pages.
"Third Office Action Issued in Chinese Patent Application No. 201210331725.X", Mailed Date: Apr. 6, 2016, 5 Pages.

\* cited by examiner

200

SHARED ITEM ACCOUNT SELECTION

BACKGROUND

The availability and popularity of web-based content and services is ever increasing. For example, users are increasingly using online storage services that provide storage "in the cloud" for content items (e.g., documents, application files, photos, mobile uploads, audio/video files, etc.). Storage in the cloud makes it convenient for users to access their files over a network from anywhere using various different kinds of devices (e.g., computer, mobile phone, tablet, etc.). Due in part to this convenience, users may also seek ways in which to share content items from their online storage with others.

Traditionally, though, online storage services provide limited tools for sharing items particularly in the case of sharing items to multiple sites, groups, and/or individuals. For instance, a user may have to individually configure an email or message for each intended recipient of a shared item and/or may have to manually provide a shared item as an attachment. In some cases, a user may even have to download a stored item locally before they can share the item through email or another messaging system. Thus, traditional techniques for sharing items from online storage may be quite inconvenient.

SUMMARY

Techniques for sharing of items from online storage (e.g., cloud storage) are described herein. Sharing links for items maintained in online storage available from a service provider can be generated and distributed in various ways. The sharing links may provide recipients with access to shared items online from storage associated with the sender. The sender is able to manage permissions associated with different sharing links sent to different recipients on an individual basis.

In one or more implementations, sharing links can be configured as one-time sharing links that provide recipients with limited, one-time access to a shared item for the purpose of selecting or registering an account to use for subsequent access to the item. In this manner, recipients are able to select accounts they find most convenient for accessing a shared item without the owner/sharer of the item necessarily having contact information for those accounts or sending a link to the accounts. Selection of a one-time link may initiate an authentication sequence that incorporates an option to select a particular account if appropriate. Once the one-time sharing link is redeemed, the one-time sharing link is invalidated for subsequent access to the item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
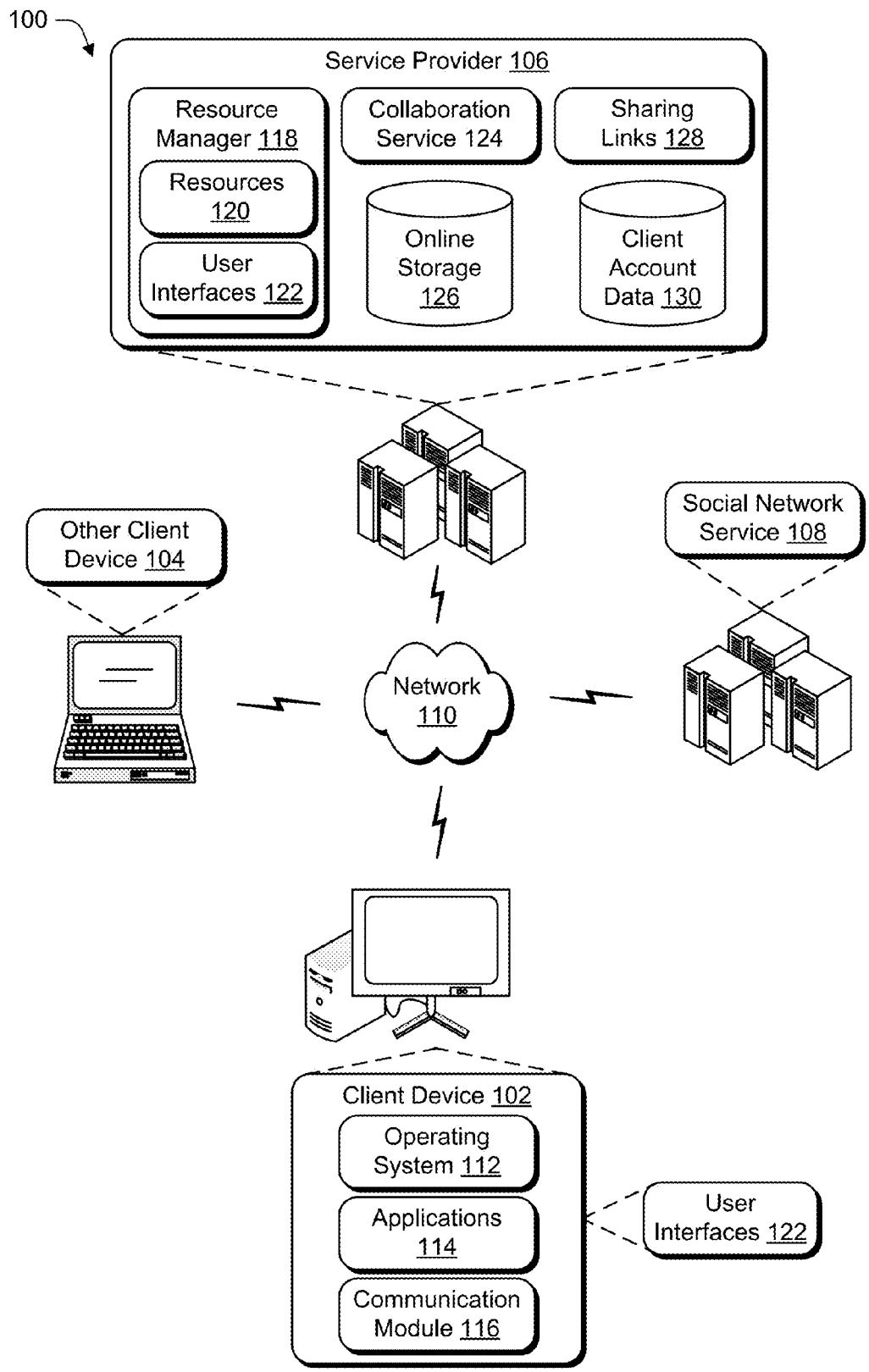
FIG. 1 is an illustration of an environment in which sharing links for online storage may be employed in accordance with one or more embodiments.

Traditionally, online storage services provide limited tools for sharing items particularly in the case of sharing items to multiple sites, groups, and/or individuals. For instance, a user may have to manually attach items to messages and/or publish an item to multiple different services/sites that the user wants to receive the item. Thus, traditional techniques for sharing items from online storage may be inconvenient.

Techniques for sharing of items from online storage (e.g., cloud storage) are described herein. In one approach, distinct sharing links to an item can be generated for multiple different publish targets through a single publishing user interface exposed to a user. Through the publishing user interface, a user may submit a request having a selection of different social networks and/or other sites/targets to receive a sharing link for an item. In response to the request, a distinct sharing link is generated for each selected recipient and the generated sharing links are published to appropriate targets. Thus, a user is able to easily send links for a shared item to multiple targets through a single request and can separately manage permissions associated with each distinct sharing link.

In another approach, sharing links can be configured as group opt-in links designed to provide recipients with an option to join a group having permissions on a corresponding shared item. An owner of an item may distribute a group opt-in link publicly and does not have to predetermine the group size or individual members. Recipients of the link can choose whether to join the group or not. The group opt-in link may provide limited access to join the group and then members who join the group may gain enhanced permissions to the shared item. The owner of the item is able to see individuals who have opted-in and manage corresponding permissions on an individual basis.

In another approach, sharing links can be configured as one-time sharing links that provide recipients with limited, one-time access to a shared item for the purpose of selecting or registering an account to use for subsequent access to the item. The owner/sharer of the item may use any available contact information to send one-time sharing links. A recipient is then able to use the link to select an account the recipient would like to use to access the shared item. The owner/sharer does not need to send the link to the selected account or even have contact information for the account. Once the one-time sharing link is redeemed to select an account, the link may be invalidated for subsequently gaining enhanced permission to the item.

In the following discussion, an example operating environment is first described that may employ the techniques described herein. The discussion of the example operating environment includes a discussion of an example user interface to facilitate interaction with online storage. Next, example details and techniques are described which may be implemented in the example environment as well as other environments. Consequently, performance of the techniques is not limited to the example environment and the example environment is not limited to performance of the example techniques. Lastly, example systems and devices are described that may be employed to implement one or more embodiments.

Example Operating Environment

FIG. 1 is an illustration of an environment 100 in an example implementation that is operable to employ techniques described herein. The illustrated environment 100 includes a client device 102, another client device 104, a service provider 106, and a social network service 108 that are communicatively coupled via a network 110. The client device 102, other client device 104, service provider 106, and social network service 108 may be implemented by one or more computing devices and also may be representative of one or more entities. The social network service 108 is representative of various external web services/sites (e.g., partner sites) that may operate in conjunction with the service provider 106 to provide additional/enhanced experiences and services to users. In at least some embodiments, this occurs through linking or otherwise associating user accounts with the service provider 106 to corresponding accounts with the external web services/sites.

A computing device may be configured in a variety of ways. For example, a computing device may be configured as a computer that is capable of communicating over the network 110, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers utilized by a business to perform operations such as by the service provider 106 and/or social network service 108, and so on.

Although the network 110 is illustrated as the Internet, the network may assume a wide variety of configurations. For example, the network 110 may include a wide area network (WAN), a local area network (LAN), a wireless network, a public telephone network, an intranet, and so on. Further, although a single network 110 is shown, the network 110 may be configured to include multiple networks.

The client device 102 is further illustrated as including an operating system 112. The operating system 112 is configured to abstract underlying functionality of the underlying device to applications 114 that are executable on the client device 102. For example, the operating system 112 may abstract processing, memory, network, and/or display functionality such that the applications 114 may be written without knowing "how" this underlying functionality is implemented. The application 114, for instance, may provide data to the operating system 112 to be rendered and displayed by a display device as illustrated without understanding how this rendering will be performed.

The client device 102 is also illustrated as including a communication module 116. The communication module 116 represents functionality to enable various communications over the network 110. For example, the communication module 116 may be implemented as a browser or other suitable application to obtain and output webpages and/or other user interfaces from the service provider 106 over the network 110. The communication module 116 may also represent a component of another application used to obtain one or more resources from the service provider 102.

The service provider 106 is depicted as storing a resource manager 118 that represents functionality operable by the service provider 106 to manage various resources 120 that may be made available over the network 108. For example, various resources 120 may be provided via webpages or other user interfaces 122 that are communicated over the network for output by one or more clients via a communication module 116 or other client application. The resource manager 118 may manage access to the resources 120, performance of the resources, and configuration of user interfaces 122 to provide the resources 120, and so on. The service provider 106 may represent one or more server devices used to provide the various resources 120.

Generally, resources 120 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources 120. Content may include various combinations of text, multi-media streams, documents, application files, photos, audio/video files animations, images, web pages, web applications, device applications, content for display by a browser or other client application, and the like.

One particular example of a resource 120 that may be provided by a service provider 106 is a collaboration service 124 as depicted in FIG. 1. The collaboration service 124 is representative of functionality operable to provide and manage online storage 126 that may be allocated to user accounts associated with the service provider 106. The online storage 126 provides users with storage "in the cloud" for content items such as documents, application files, photos, mobile uploads, and audio/video files so user may access their content items from anywhere over the network 110, and share content to collaborate with others. The collaboration service 124 enables users to share files with other individuals and/or groups through sharing links 128 that can be created and distributed for particular content items in various ways. The sharing links 128 are configured to implement permissions that may be set to control who is able to view, edit, or otherwise interact with corresponding content items, as discussed in greater detail in relation to FIG. 2.

Clients may access the collaboration service 124 and other resources 120 provided by a service provider 106 through user accounts represented by client account data 130 of FIG. 1. The client account data 130 may include account identifiers, credentials, access permissions, profile data and other data typically associated with user accounts. The resource manager 118 may implement or otherwise make use of an authentication service operable to authenticate clients to access various resources 120 including the collaboration service 124. The authentication service may be provided as a component of the service provider 106, as a standalone service, by a third party provider, or otherwise. To access resources 120, a client device 104 may provide a username and password that is authenticated by the authentication service. When the authentication is successful (e.g., the client "is who they say they are"), the authentication service may pass a token to enable access to corresponding resources. A single authentication may correspond to one or more resources, such that authentication to a single account by a "single sign-on" may provide access to individual resources, resources from multiple service providers 106, and/or to an entire suite of resources available from a service provider 106.

Figure 2:
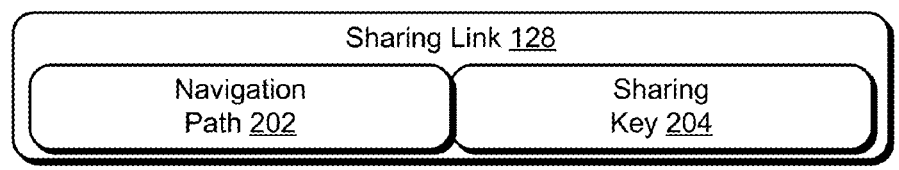
FIG. 2 is an illustration of an example sharing link in accordance with one or more embodiments.

FIG. 2 is a diagram showing an example implementation of a sharing link 128 in accordance with one or more embodiments, generally at 200. In this example, the sharing link 128 is constructed to include a navigation path 202 that is associated with a sharing key 204. The navigation path 202 provides a path that can be used to navigate to a corresponding content item. For example, the navigation path 202 may be configured as a uniform resource identifier (URI) that when selected causes an application such as a browser to navigate to a location where the resource is available. The sharing key 204 is configured as key, token, or other shared secret that can be used to make different distinct sharing links 128 to the same resource. Thus, the sharing key 204 uniquely identifies a particular, corresponding sharing link 128 and can be used to distinguish between sharing links.

Additionally, the sharing link 128 can encode data that defines or references permissions for a corresponding item. The permissions designate access levels and corresponding actions for content items. For instance, different access levels may be established to control who is able to perform actions such as read-only, print, publish, view, edit, one-time access, move, and/or copy, to name a few examples. In one approach, the service provider 106 maintains a table or other database that can be used to match a sharing key 204 to corresponding permissions on content items. Such permission data may be maintained as part of the file structure for online storage 126 along with individual files. This may include maintaining access control lists (ACLs) that may be referenced by or otherwise mapped to sharing keys 204. Additionally or alternatively, permissions can be encoded directly within a sharing link using an access parameter or other suitable field that is indicative of a corresponding permission level. The collaboration service 124 may be configured to reference and interpret the access parameter in a sharing link 128 and enforce corresponding permissions when the sharing link 128 is used to gain access to an item.

Figure 3:
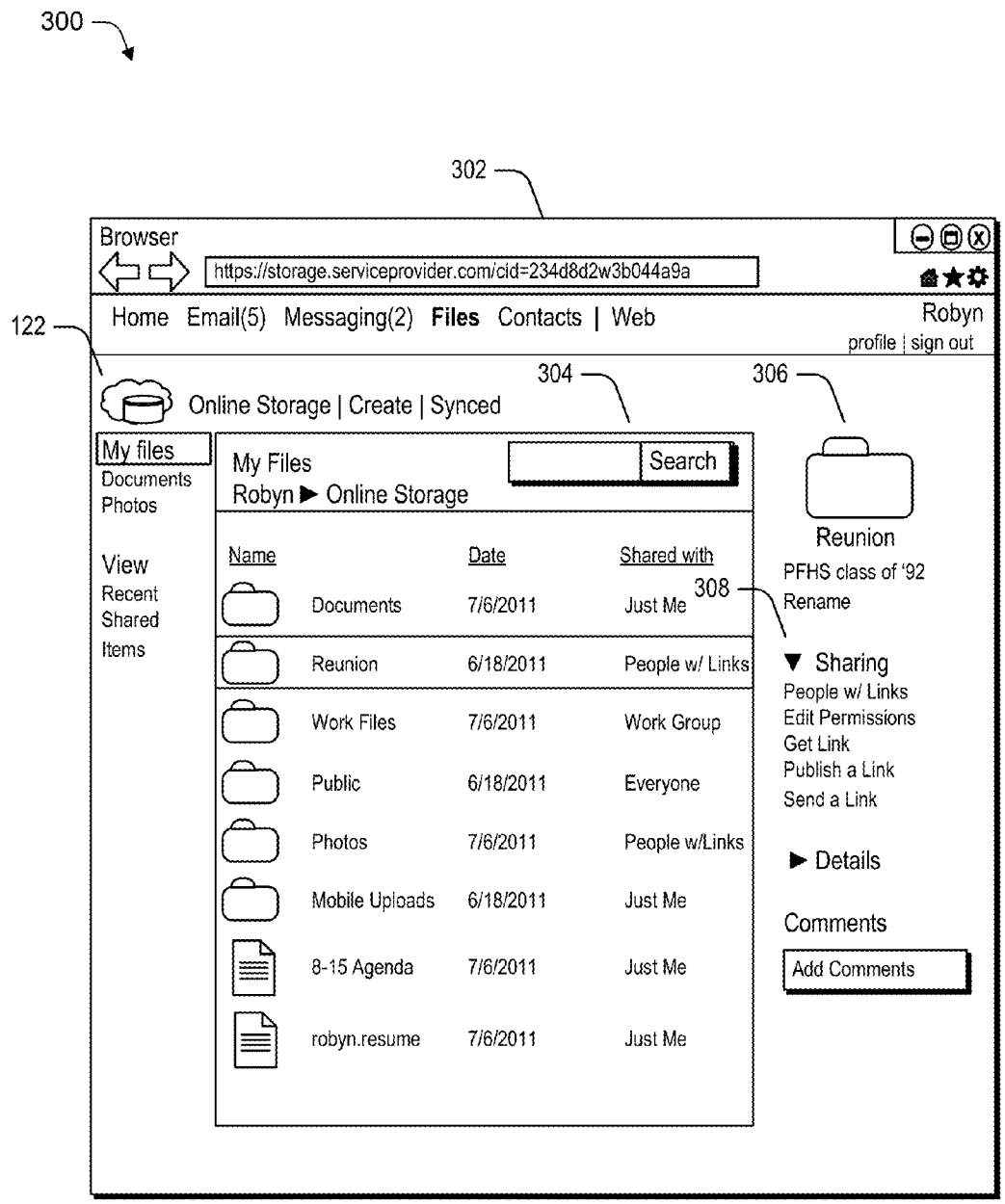
FIG. 3 depicts an example user interface for interaction with online storage in accordance with one or more embodiments.

FIG. 3 depicts a diagram 300 showing an example user interface 122 that includes one or more portions to enable interaction with online storage in accordance with one or more embodiments. The user interface 122 in this instance is illustrated as incorporated within a user interface 302 that may be provided by the communication module 116. For example, the communication module 116 may be configured as a browser operable to expose the user interface 302 to enable interaction with one or more service providers 106 and corresponding resources 120. The user interface 122 for example may be configured and provided by way of the collaboration service 124 as previously described.

To provide the interaction with online storage, the user interface 122 may expose a file management portion 304 to enable navigation, viewing, and management of content items stored "in the cloud" in association with a user/account. A file management portion 304 can be configured in any suitable way to enable the interaction with online storage, such as representing content items in a list, showing different icons or tiles for stored items, using a preview pane, and so forth. In the depicted example, the file management portion 304 is shown as a "My Files" list for a logged in user "Robyn." The list of content items represents files available to Robyn from her online storage 126 through the collaboration service 124 including documents, folders, photos, and other types of content mentioned previously. The list of content items shows names for individual files and folders as well as basic information associated with each item, such as the example date and sharing columns depicted in FIG. 3.

An item details portion 306 is also shown that may be configured to provide more detailed information regarding a selected item, which in this example presents details for a "Reunion" folder selected from the list of content items. In addition, the user interface 122 includes a sharing portion 308 that represents functionality to review and manage sharing options for content items. In this example, the sharing portion 308 is incorporated as part of the item detail portion 306. Alternatively, a sharing portion 308 may be provided as a separate portion or even a separate page that is accessible via a link, menu item, or other navigation instrumentality exposed in the user interface 122. The sharing portion 308 is configured to provide various options for sharing of selected items. This may include creating sharing links 128, viewing and setting permissions for items, publishing links to a social network service 108 or other external web service/site, distributing links using various messaging systems, and so forth.

Thus, a user interface 122 such as the example just described may be employed to facilitate various interactions to access online storage 126 and/or share items. In accordance with sharing link techniques described herein, distinct links to a content item may be generated for different publish targets. In addition, links may be shared to an arbitrary group through a corresponding sharing link 128. In this case, sharing link 128 is configured to expose an option for recipients to opt into the group having permissions on the item. Thus, recipients explicitly opt into the group before gaining full permission to the item. In another example, a recipient of a link may be able to choose a particular account to use for access a shared item. This may occur through a one-time link that may be redeemed once to access the item and associate a selected account for subsequent access to the shared item. Further details regarding each of these examples are discussed in turn below in different sections titled "Distinct Links for Publish Targets," "Group Opt-In Links," and "Shared Item Account Selection," respectively.

Thus, having considered the foregoing discussion of an example operating environment and an example user interface for interaction with online storage, consider now details regarding techniques to employ sharing links in accordance with one or more embodiments.

Distinct Links for Publish Targets

This section describes techniques for publishing of sharing links 128 to different selected publish targets. In portions of the following discussion, reference will be made to the example environment 100 of FIG. 1 and example user interface of FIG. 3. Generally speaking, a user may access associated online storage 126 through a collaboration service 124. The user may be able to select an item to share as well as target recipients to receive a link to the item. The user action to share the item causes the collaboration service 124 to generate one or more sharing links 128 to the item. In one approach, the collaboration service 124 may generate distinct links to the same item for multiple different publish targets selected by the user. Accordingly, different permissions may be associated with the distinct links and the distinct links may be separately presented and managed. Just below, an example procedure is discussed followed by some example user interfaces illustrating further details regarding distinct links.

Figure 4:
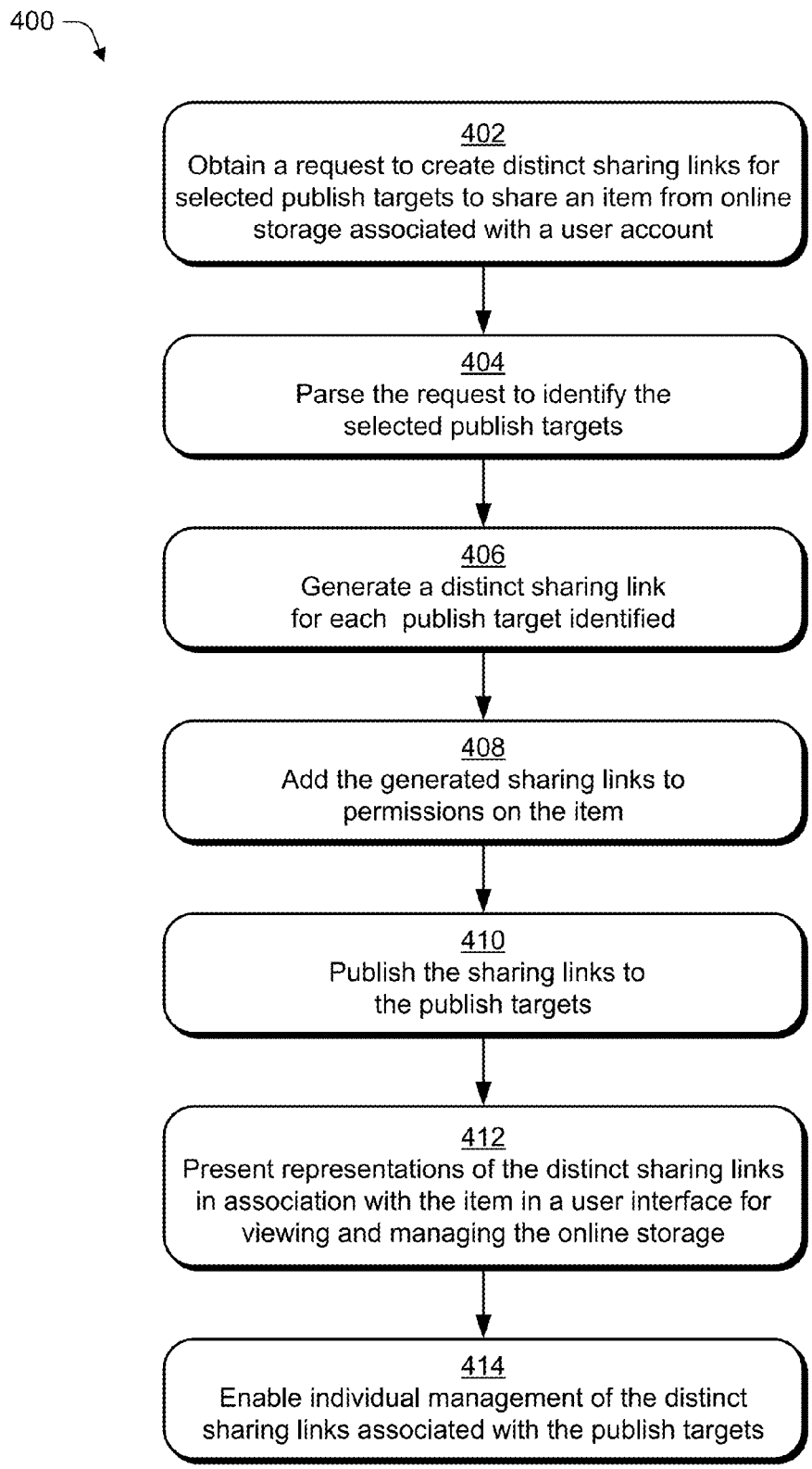
FIG. 4 is a flow diagram depicting an example procedure in which distinct sharing links are generated for different publish targets.

FIG. 4 depicts a procedure 400 in an example implementation in which distinct links are generated for different publish targets. Aspects of each of the procedures described herein may be implemented in hardware, firmware, or software, or a combination thereof. The procedures are shown as a set of blocks that specify operations performed by one or more devices and are not necessarily limited to the orders shown for performing the operations by the respective blocks.

A request is obtained to create distinct links for selected publish targets to share an item from online storage associated with a user account (block 402). The request, for instance, may be formed via a user interface 122 output at a client device 102 for interaction with online storage 126 associated with a user. Thorough the user interface 122, an item to share as well as different targets may be selected. This may occur through a publish control or page link provided as part of the user interface 122. At least some of the targets may be social network services or other partner sites to which the user wishes to publish a link for the selected item.

The request may be formatted in any suitable way to encode information describing the selected item and targets. For example, the request may be configured as a hyper-text transfer protocol (HTTP) request using JavaScript, XML, HTML and/or other scripting languages. The request may include variables, parameters, and/or other suitable identifiers used to submit the item and targets for handling by a service provider 106. Thus, the request may be formatted to encode the user selections in some manner and then submitted, which causes the client device 102 to communicate the request to a service provider 106. In one example, a collaboration service 124 implemented by the service provider 106 is configured to obtain the request and process the request to generate corresponding sharing links 128. In at least some embodiments, the collaboration service 124 may expose an application programming interface (API) that can be called with the request via script within a webpage or other user interface 122 to initiate creation of sharing links 128. In addition or alternatively, any client-server architecture and/or communication protocols suitable for passing requests/responses between a client device 102 and service provider 106 may be employed to implement the techniques related to sharing links described herein.

In particular, the request is parsed to identify the selected publish targets (block 404). For instance, the collaboration service 124 is able to interpret the request and extract information contained therein to identify selected publish targets. The collaboration service 124 also obtains from the request an identifier of the particular item to be shared with the publish targets. This information enables the collaboration service 124 to construct sharing links 128 as described previously.

For instance, a distinct sharing link is generated for each publish target identified (block 406) and the generated sharing links are added to permissions on the item (block 408). Here, the collaboration service 124 constructs a different link for each identified target. Each link may include a navigation path 202 to the item and a sharing key 204 as discussed above. The navigation path 202 to the item may be the same for each link. The sharing key 204, though, may be generated as a unique identifier that is different for each link and corresponding target. In one example, the sharing key 204 is configured as a token that is different for each link.

Permissions to a shared item can also be encoded within the generated sharing links. As mentioned, the token or other sharing key 204 may be mapped to permissions on the item using ACLs that define the permissions. Thus, to encode permissions the collaboration service 124 may update the ACLs to reflect respective permissions designated for each of the generated sharing links. Using this technique, the system can store a mapping of permission for a sharing link that may or may not be apparent to the recipient(s) of the sharing link. In another approach, the sharing key 204 itself can be used to designate the permissions that the corresponding link grants to recipients/users of the link. In this case, the collaboration service 124 may be configured to interpret the sharing key 204 when a link is used to determine and enforce corresponding permissions.

The sharing links are published to the publish targets (block 410). For example, the collaboration service 124, in addition to creating the links, may be configured to publish links to various partner sites. Such partner sites may expose network accessible application programming interface (APIs) that can be invoked to publish information to user accounts. For instance, a post link or post picture API may be provided to post content to a social network service 108. The collaboration service 124 may be configured to form calls in appropriate formats designated by different supported partner sites via such APIs or otherwise. This enables a user of the collaboration service 124 to interact once to select an item and publish target, submit a single request, and then turn over handling to the collaboration service 124 to create the appropriate links and post the links to corresponding publish targets. Accordingly, the user is able to avoid individual creation and manually post links to different targets.

Representations of the distinct sharing links are presented in association with the item in a user interface for viewing and managing the online storage (block 412) and individual management of the distinct sharing links associated with each publish target is enabled (block 414). Since distinct sharing links are created for different targets, the links may be used and managed separately from one another. Thus, the collaboration service 124 may separately represent the distinct sharing links for an item within a user interface presented to review and manage stored items. For example, different sharing links may be listed via a sharing portion 308 of a user interface 122 as discussed in relation to FIG. 3. In this way, a user is able to review each of the links generated for a particular item and see associated permissions. Additionally, the collaboration service 124 is configured to provide various options to separately manage distinct links for an item. This includes, but is not limited to, actions such as associating and changing permissions individually for different links, removing one or more links (e.g., un-publishing links) and/or invalidating a link without affecting other links on an item. Additional details regarding creating, using, and managing distinct links are provided in relation to example user interfaces of FIGS. 5 and 6.

Figure 5:
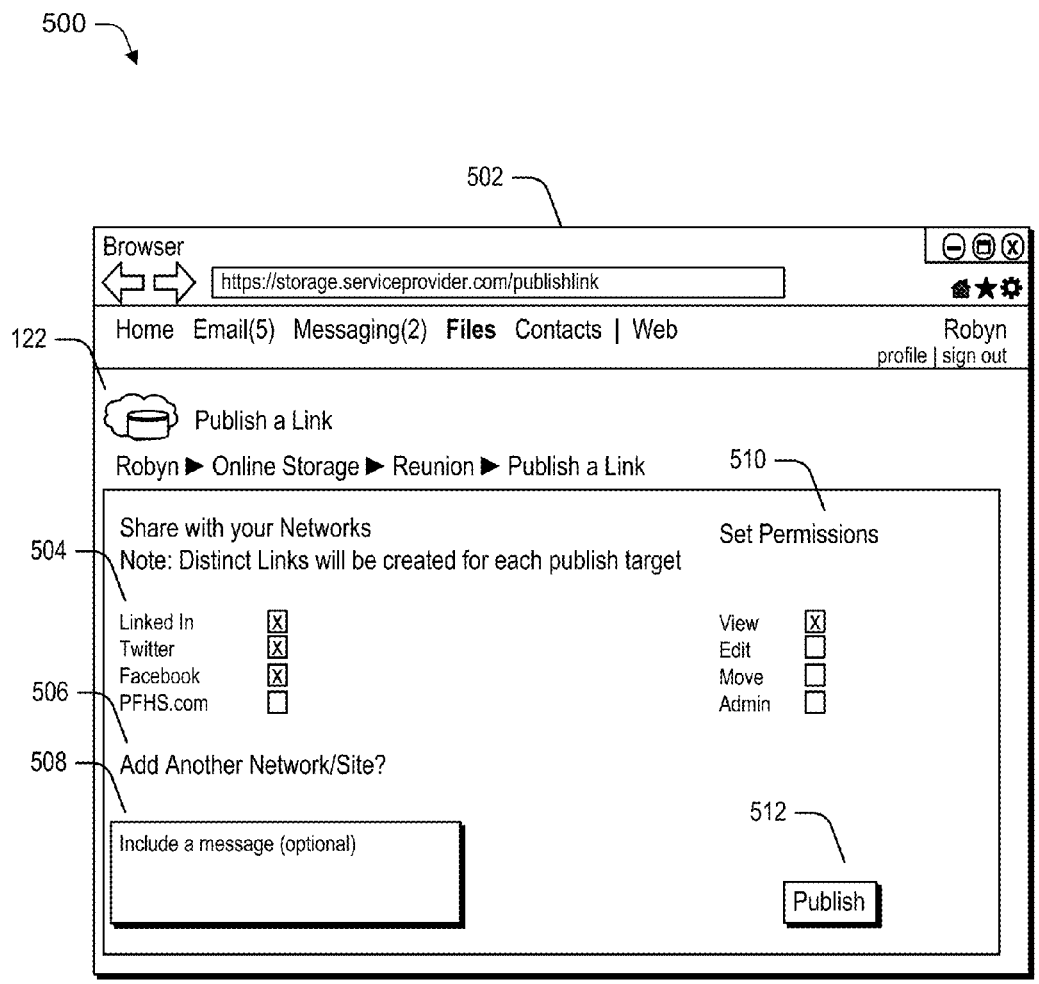
FIG. 5 depicts an example user interface for publishing a sharing link in accordance with one or more embodiments.

FIG. 5 depicts a diagram 500 showing an example user interface 122 that can be employed to publish a link to selected targets as just described. The user interface 122 in this instance is illustrated as incorporated within a user interface 502 that may be provided by the communication module 116. For example, the communication module 116 may be configured as a browser operable to expose the user interface 502 to enable interaction with one or more service providers 106 and corresponding resources 120. The interface 502 may alternatively be provided using a separate tab, a pop-up dialog box, an expandable portion of a page, or otherwise.

In at least some embodiments, the interface 502 may be accessible by selection of a link, menu item, or other navigation control provided in the example user interface of FIG. 3. For instance, the example interface depicted in FIG. 5 may be presented responsive to selection of the "Publish a Link" object appearing within the sharing portion 308 in FIG. 3. Thus, the different interfaces in the examples of FIGS. 3 and 5 may represent different pages available via the collaboration service 124.

Here, the example user interface 122 is operable to create distinct sharing links 128 for the "Reunion" folder of FIG. 3. A target selection portion 504 may be provided to enable input of a selection of publish targets by a user in any suitable way. In the depicted example, a list of available targets is presented along with check boxes to select/deselect different targets. The list may represent targets that have been pre-associated with a user's account. Other selection controls such as a drop down box, search tool, list box, and/or other selection tools may also be implemented to enable input of the selection. In addition, an add control 506 may be provided to enable a user to explicitly search for and/or add another network/site as a publish target. It should be noted, that publish targets to which distinct links are provided may also include individual people or contacts. Once added, a site/network/individual may automatically appear as a pre-associated option in subsequent publish operations.

The example user interface 122 of FIG. 5 further includes a message input portion 508, a permissions portion 510, and a publish control 512. The message input portion 508 enables input of an optional description or message to accompany a published link. The permissions portion 510 enables selection of permissions to associate with the created links. For instance, the permissions portion 510 may allow a user to select whether created links may be used to view, edit, move, and/or grant admin rights to a corresponding item. In the illustrated example, the permissions portion 510 is configured to apply globally to each of the selected publish targets. In another approach, individual permissions portions 510 may be associated with each target to enable selection of different permissions for the different links. Again, various selection controls may be employed to implement permissions portions 510 including for example, check boxes, list boxes, drop down boxes, search tools, and other typical selection tools. The publish control 512 when selected causes a request having the selection made via the example interface to be submitted for handling by the service provider 106 and/or collaboration service as previously described.

Figure 6:
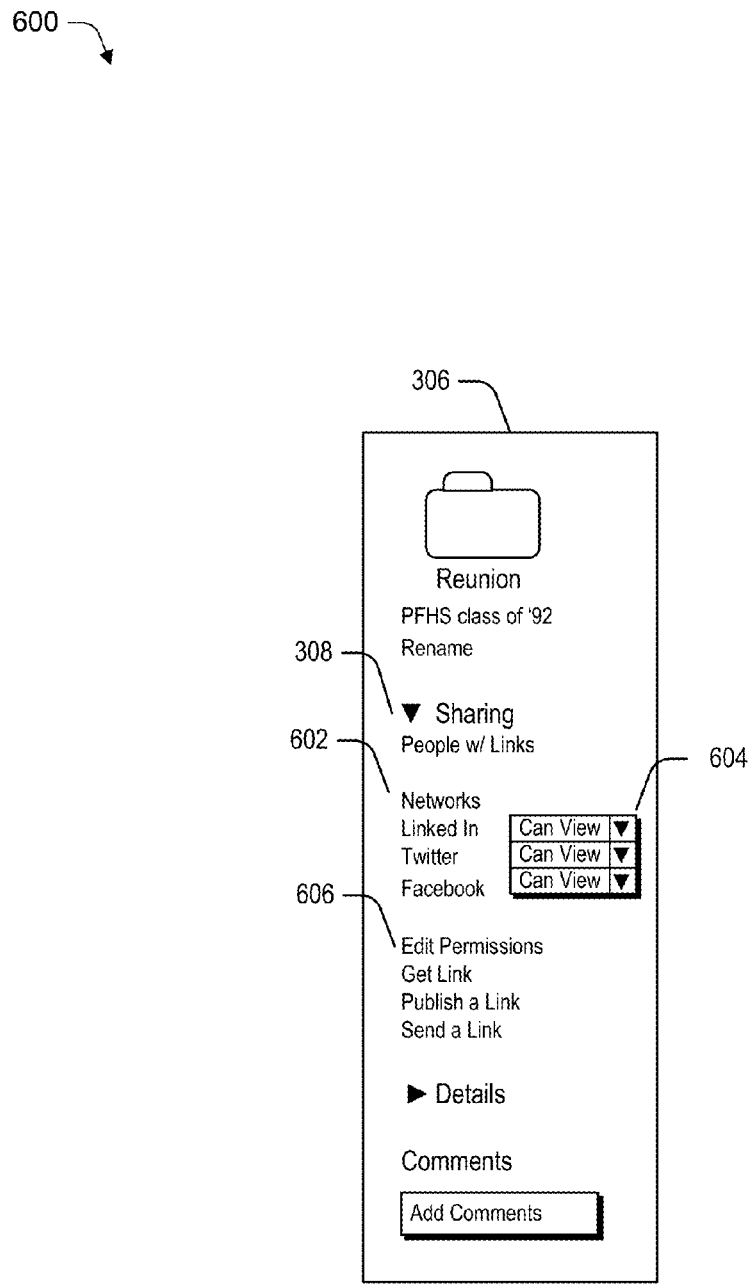
FIG. 6 depicts an example user interface for management of distinct sharing links in accordance with one or more embodiments.

FIG. 6 depicts a diagram 600 showing a sharing portion for review and management of distinct links. In particular, the item detail portion 306 of FIG. 3 is shown after distinct links are created for the "Reunion Folder" and the page is refreshed. Now, the sharing portion 308 has been reconfigured to include a list 602 of the distinct links created in accordance with procedure 400 of FIG. 4. A representation of each distinct link published for the particular item is provided along with a corresponding permission control 604. The permission controls 604 enable a user to individually view and manage permissions associated with the distinct links. For example, the permission controls 604 are illustrated as list boxes operable to select an access level (e.g., view, edit, move, copy, print, admin, etc.) for individual links. Further, the permission controls 604 may enable invalidation/removal of links on an individual basis. In addition to or in lieu of providing permission controls 604, a edit permissions control 606 may be included. The edit permissions control 606 may be selectable to navigate to a permissions page that exposes various tools and options for review and management of permissions for particular items.

Group Opt-In Links

This section describes techniques for sharing links 128 configured to provide an option to opt-in to a group having permissions on an item. In portions of the following discussion, reference will again be made to the example environment 100 of FIG. 1 and example user interface of FIG. 3. Generally speaking, a user may access associated online storage 126 through a collaboration service 124. The user may be able to select a get a link option that causes a collaboration service 124 to provide a link for sharing an item. The user may then take action to copy and/or distribute in various ways. In one approach, the collaboration service 124 configures the link such that selection of the link causes an option to be exposed to join a group having permissions on a corresponding item. The group is not necessarily predetermined and recipients of the link may be granted limited or no access to the item until the recipients explicitly opt into the corresponding group. Group membership is determined by those that exercise the group opt-in option. Recipients that do opt-in are granted permissions on the item that are established for the group. Subsequently, the owner of the item may view a list of recipients who have opted-in as members of the group, modify the group permissions, and/or modify permissions for members of the group on an individual basis. Just below, an example procedure is discussed followed by some example user interfaces illustrating details of techniques for group opt-in links.

Figure 7:
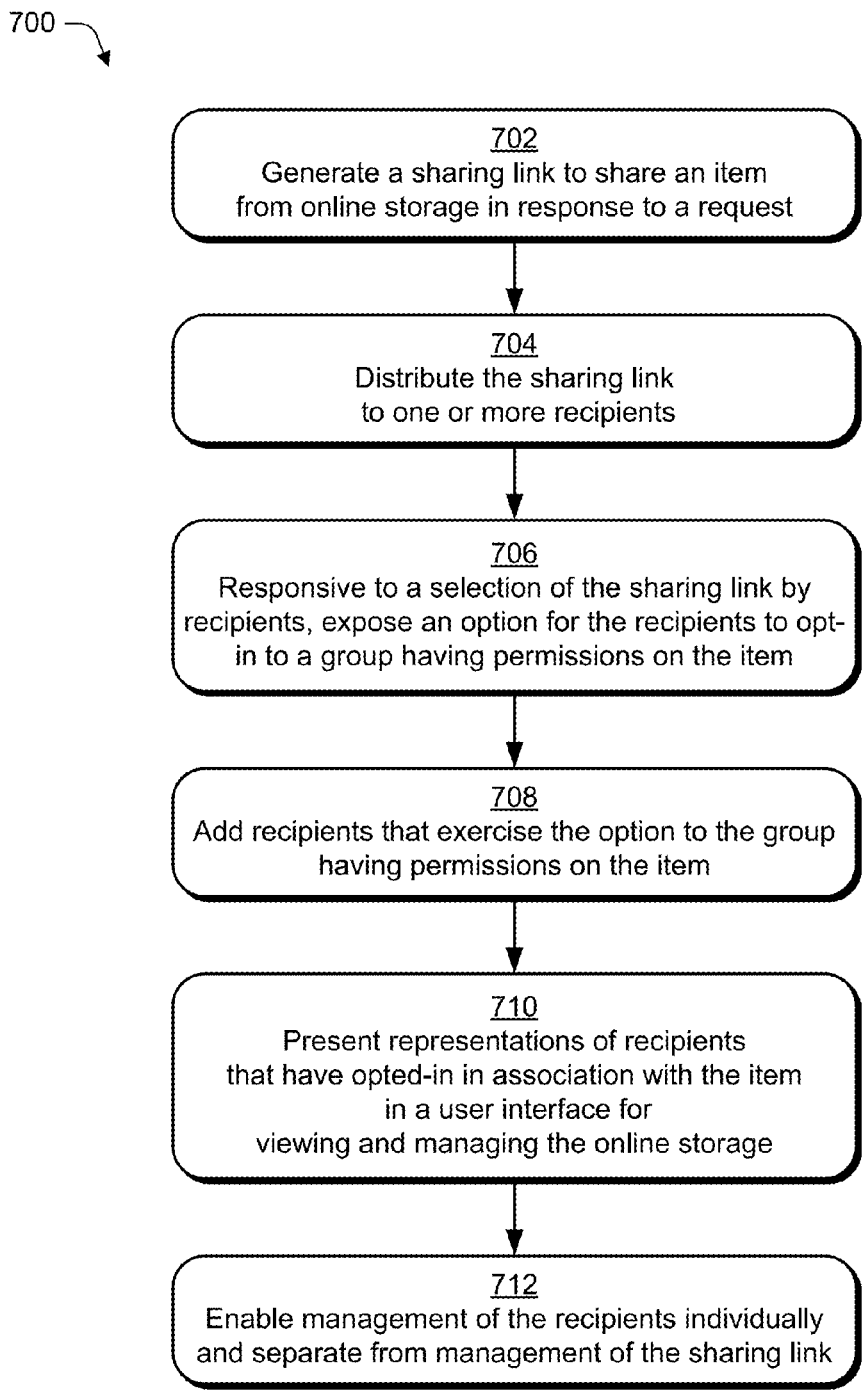
FIG. 7 is a flow diagram depicting an example procedure in which group opt-in links are employed to expose an option to join a group for a shared item.

FIG. 7 depicts a procedure 700 in an example implementation in which links configured for explicit opt-in to a group for a shared item are generated. A sharing link to share an item from online storage is generated in response to a request (block 702). As before, the request to get a link may be formed via a user interface 122 output at a client device 102 for interaction with online storage 126 associated with a user. A "get a link" request may also be formatted using various scripting languages, protocols, and/or communication techniques as discussed previously.

In one approach, the collaboration service 124 creates a link in response to the request that includes a navigation path 202 and a sharing key 204 as previously discussed. After generating the link, the collaboration service 124 communicates the link back to the client device 102 for presentation to the user. For instance, the collaboration service 124 may configure a webpage or other suitable user interface 122 including the link and return the webpage for output at the client in response to the request.

The collaboration service 124 may also configure the link to cause a group opt-in option to be exposed when the link is selected (e.g., clicked or navigated to) by recipients. This may occur in a variety of ways. For example, the sharing key 204 may be used as an identifier that prompts the collaboration service 124 to present an appropriate option to join a group when a link is used to gain access to the item. ACLs maintained by the collaboration service 124 may be used to designate that a particular sharing key is configured to cause the group opt-in option. The collaboration service 124 may use the sharing key 204 (or an identifier contained therein) to look-up permissions and properties of the corresponding link in the ACLs. Based on this matching of the sharing key 204 to ACLs, the collaboration service 124 is able to determine whether the link is a configured for the group opt-in option.

In addition or alternatively, the collaboration service 124 may examine the sharing key 204 or another field contained within the link and determine directly from the examination that the link is configured for the group opt-in option. For example, a particular string or value associated with sharing key 204 may be used as a toggle to selectively indicate whether the group opt-in option is activated. Thus, the collaboration service 124 may set the toggle to activate the group opt-in option when generating a sharing link, which then prompts the collaboration service 124 to present the appropriate option when the link is used by a recipient.

The sharing link is distributed to one or more recipients (block 704). The sharing link may be communicated to a user and/or distributed to recipients in various ways. For example, the sharing link 128 generated per block 702 may be presented in a user interface 122 that enables a user to view and/or copy the link. The user may then distribute the link to selected recipients in any suitable way. For example, the user may copy the link into a message and send the link to selected recipients as an email, instant message, text message, and so forth. Further, the user may take action to post the link to web services/sites, such as adding the link to a user profile page with a social network service 108. The link may also be distributed using other techniques such as by word of mouth, in ads, in written communications (electronic and/or physical), and so forth. In addition to providing a link that can be copied, a user interface 122 may also be configured to facilitate distribution of the link using one or more techniques as discussed further in relation to FIG. 8 below.

Note that distinct links as discussed above can also be created to activate the group opt-in option. If the user so chooses, the sharing link 128 generated per block 702 may be distributed to multiple publish targets using techniques discussed in relation to FIGS. 4-6. For example, the user may select a publish option that exposes an interface for selection of publish targets comparable to the example of FIG. 5. In this case, the distinct links created when the user publishes the link may also be configured to activate the group opt-in options. This may occur by modifying or otherwise employing the sharing link 128 generated per block 702 to produce multiple distinct links for the selected targets. Each of the distinct links is configured to include a sharing key or other suitable identifier to indicate that the group opt-in option is active.

Responsive to selection of the sharing link by recipients, an option is exposed for the recipients to opt into a group having permissions on the item (block 706). As mentioned above, the collaboration service 124 may examine a selected link to detect a sharing key 204 or other identifier that is indicative of the group opt-in option. A determination that the group opt-in option is active prompts the service to present the appropriate option when the link is used by a recipient. In some cases, a comparison is made to ACLs that encode whether the group opt-in option is active or inactive for corresponding links. The collaboration service 124 may also identify that the group opt-in option is active based on a particular value, string, or toggle field incorporated within a sharing link 128 when the link is created.

When the group opt-in option is appropriate, the collaboration service 124 operates to present the option to the recipient. This may occur in a variety of ways. For example, an opt-in interface or dialog may be output for display by a client device 102. The opt-in interface or dialog presents recipients with the option to join the group and enables a recipient to explicitly opt-in to the group having permissions on the item. Additionally, a recipient may be asked to select an account to associate with the item/group in accordance with techniques discussed below in relation to FIGS. 10-13.

More generally, note that the different techniques related to sharing links described in different sections herein may be combined in various ways. Thus, techniques described for distinct links, group opt-in links, and one-time sharing links may be implemented individually and/or may be combined in some scenarios to create sharing links configured for multiple purposes.

Recipients that exercise the option are added to the group having permissions on the items (block 708). In particular, permissions defined in an ACL or otherwise for an item are updated to reflect addition of recipients that opted in as members. This may involve associating account identifiers and/or credentials for the recipients that opt-in with the group, permissions, and/or corresponding item to make the recipients members of the group.

As noted group membership is determined by those that exercise the group opt-in option and therefore the group is not necessarily predetermined in membership or size. The owner of the item/group does not have to manually select each member to create the group and does not need to have contact information for individual people. Rather, the owner simply gets a link per block 702 and can post the link to a public site or otherwise distribute the link. In this case, the link is effectively public and anyone who possesses the link may use the link to gain access to at least the group opt-in option for the item.

The group opt-in option may implement a tiered access level approach in which permissions on the item change from a first level of access before opting-in to a second level of access after opting-in. Initially, a link may be associated with initial, basic permissions on the item. The initial permissions may be set by default and/or may be designated by the user. In general, the initial permissions available through the sharing link grant limited or no access to the item. For instance, the initial permissions may be set to limit access to viewing of the item or viewing just a preview of the item. Alternatively, access may be limited to obtaining and acting on the group opt-in option for the item. Opting in causes permissions to change from the initial, basic permissions to enhanced permissions on the item that are established for the group. For example, the enhanced permissions available through the group may be set to enable editing in addition to viewing the item. Thus, various different access levels may be associated with an item prior to opting-in through the sharing link and after opting-in through the group.

Representations of recipients that have opted-in are presented in association with the item in a user interface for viewing and managing the online storage (block 710) and management of the recipients individually and separate from management of the sharing link is enabled (block 712).

As with the distinct sharing links for different targets discussed previously, links configured for group opt-in and members within the group may be managed separately from one another. Thus, the collaboration service 124 may separately represent a group link and group members for an item within a user interface presented to review and manage stored items. For example, representations of different group members and/or a group opt-in link may be listed via a sharing portion 308 of a user interface 122 as discussed in relation to FIG. 3. In this way, a user is able to review each of the links and members for a particular item, see associated permissions, and/or separately manage permissions for the group and/or individual members of the group. This includes but is not limited to actions such as changing permissions individually, removing one or more members, and/or invalidating a link without affecting the access permissions of members who have already opted-in, and so forth. Additional details regarding managing group links and members are provided in relation to example user interfaces of FIGS. 8 and 9.

Figure 8:
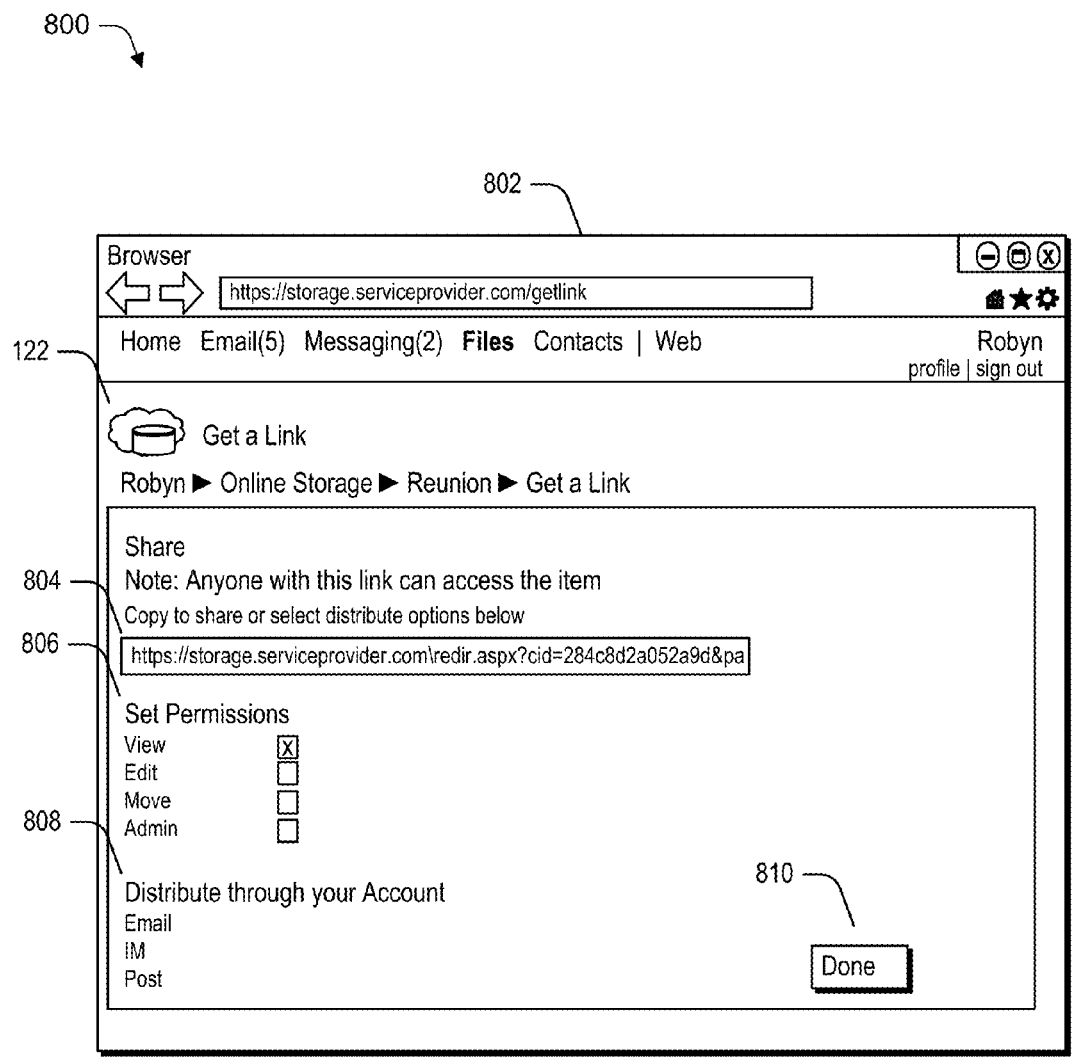
FIG. 8 depicts an example user interface for getting a sharing link to implement a group opt-in option in accordance with one or more embodiments.

FIG. 8 depicts a diagram 800 showing an example user interface 122 that can be employed to get a link for distribution to an arbitrary group. The user interface 122 in this instance is illustrated as incorporated within a user interface 802 that may be provided by a communication module 116 as with the preceding example user interfaces. In at least some embodiments, the example interface depicted in FIG. 8 may be presented responsive to selection of the "Get a Link" object appearing within the sharing portion 308 in FIG. 3.

Here the example user interface 122 is again operable to provide a sharing link 128 for the "Reunion" folder of FIG. 3. In this case, the interface provides the actual link (as opposed to publication of the distinct links in the previous section) that a user may copy and distribute in various ways. In particular, a link portion 804 is depicted that may return a link generated by a collaboration service 124 as previously described. As mentioned, the link may be configured to cause a group opt-in option to be presented when the link is selected by a recipient. In one approach, the sharing key 204 associated with the link is set to cause the option to be exposed when the collaboration service 124 interprets the link.

The example user interface 122 of FIG. 8 further includes a permissions portion 806, a distribute portion 808, and a done control 810. As with preceding examples, the permissions portion 806 enables selection of permissions to associate with the created links. For instance, the permissions portion 510 may allow a user to select whether the returned linked may be used to view, edit, move, and/or grant admin rights to a corresponding item. The user may be able to set both initial permissions before opting-in and enhanced permissions after opting-in in accordance with the tiered access level approach discussed in relation to FIG. 7.

The distribute portion 808 may be included to provide various options to share the link. For example, the example distribute portion 808 provides options to distribute by email or instant messaging. Selection of these options may be used to automatically create an appropriate message that includes the link through the service provider 106, a default messaging program, a third party messaging service, and so forth. In addition, a post option is provided that may enable publication of the link to different sites. In at least some cases, the post option may link to an interface similar to the example of FIG. 5 that may enable selection of different publish targets and/or creation of distinct links for the different publish targets. In this case, the distinct links may be generated to correspond to the particular link returned in the link portion 804 and may also cause the opt-in option to be exposed when selected. As before, a different sharing key 204 may be associated with different distinct links.

The done control 810, when selected, may cause the interface to be closed out and navigation back to a home page or start page for the collaboration service 124, such as returning to the example interface shown in FIG. 3.

Figure 9:
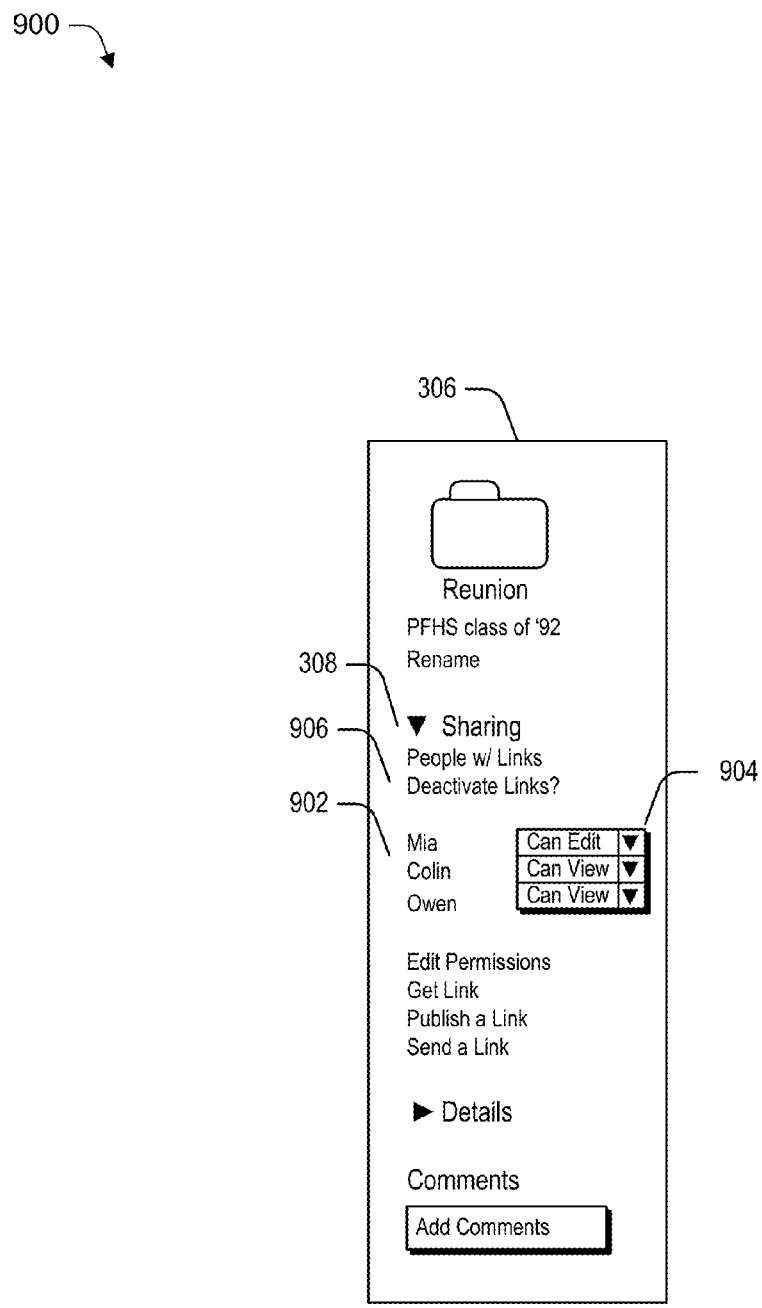
FIG. 9 depicts an example user interface for management of recipients that opt-in to a group in accordance with one or more embodiments.

FIG. 9 depicts a diagram 900 showing a sharing portion for review and management of recipients who exercise the option to join a group. In particular, the item detail portion 306 of FIG. 3 is shown after a link is distributed for the "Reunion" folder and one or more recipients opt into a corresponding group. This example is similar to the example of FIG. 6 except in this case the sharing portion 308 is reconfigured to include a list 902 of individuals who opt-in. A representation of each individual is provided along with a corresponding permission control 904. The permission controls 904 enable a user to individually view and manage permissions associated with the different individual links. For example, the permission controls 904 are illustrated as list boxes operable to select an access level (e.g., view, edit, move, copy, print, admin, etc.) for individual links.

In addition, a deactivate control 906 is provided that is operable to deactivate a distributed link. When deactivated the link is no longer usable to opt-in to the group. In at least some embodiments, deactivating the link or changing permissions associated with the link does not affect users that have already been added to the group. Thus, the individual users may be managed individually and separately from the sharing link itself. In another approach, invalidating the link or changing permissions will populate the changes to any members of the group.

Shared Item Account Selection

This section describes techniques for sharing links 128 configured to enable a recipient to select a particular account the recipient would like to use to access a corresponding shared item. In portions of the following discussion, reference will again be made to the example environment 100 of FIG. 1 and example user interface of FIG. 3. Generally speaking, a user may access associated online storage 126 through a collaboration service 124. The user may be able to select a send a link option that causes a collaboration service 124 to provide a link for sharing an item. The user may then take action to send the link to selected individuals. The user may have limited contact information for some individuals and therefore may not address the link to addresses or accounts that some recipients would prefer to use for access to the shared item. As discussed below, the collaboration service 124 may configure sharing links 128 generated in response to the send operation as one-time sharing links. In general, the one-time sharing links enable recipients to get limited, one-time access to a shared item for the purpose of selecting or registering an account to use for subsequent access to the item. Once the one-time sharing link is redeemed, the one-time sharing link may be invalidated for subsequent access to gain enhanced permissions to the item. The one-time sharing link may or may not continue remain valid for limited access, such as read-only access. In this manner, recipients are able to select accounts they find most convenient for accessing a shared item without the owner/sharer of the item necessarily having contact information for those accounts or sending a link to the accounts. Just below, example procedures are discussed followed by some example user interfaces illustrating details of techniques for one-time sharing links.

Figure 10:
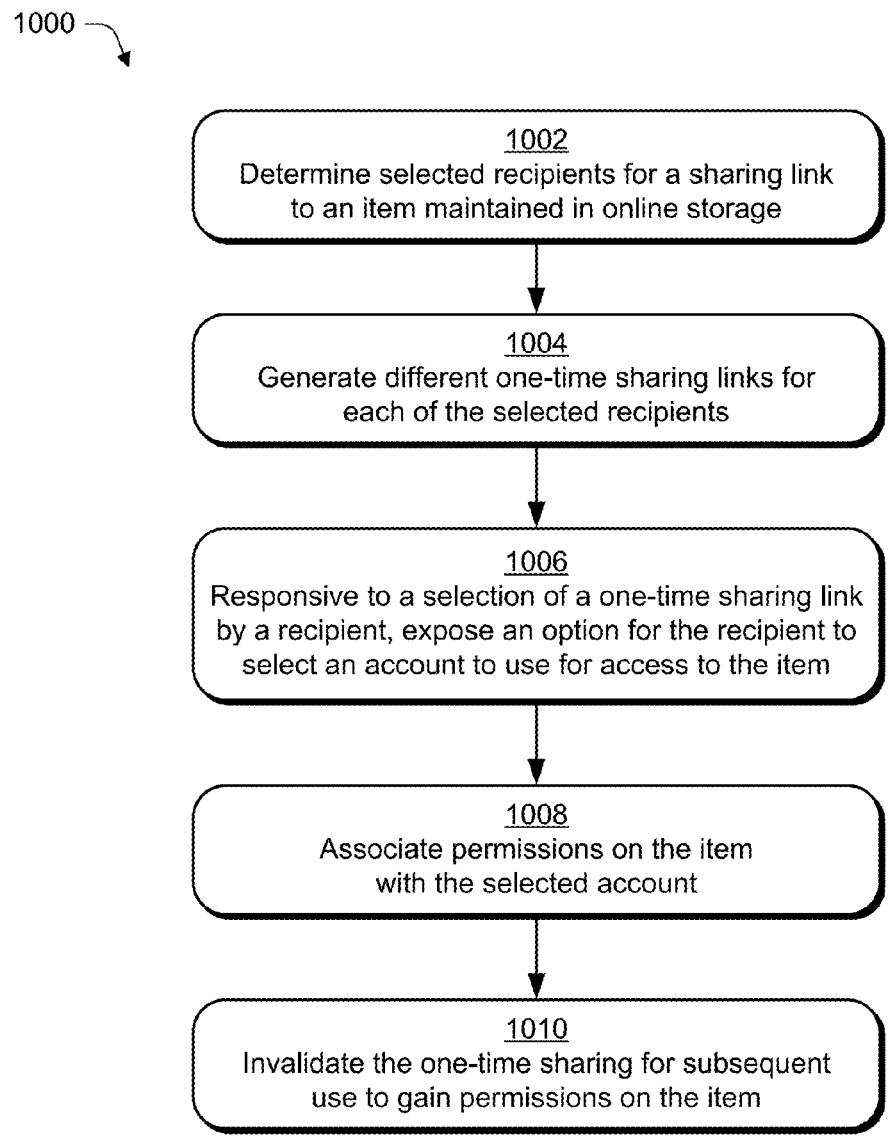
FIG. 10 is a flow diagram depicting an example procedure in which one-time sharing links are employed to expose an option to select an account for a shared item.

FIG. 10 depicts a procedure 1000 in an example implementation in which one-time sharing links are employed for selection of accounts to access a shared item.

Selected recipients are determined for a sharing link to an item maintained in online storage (block 1002). One way this may occur is through a user interface provided to enable sending of a link to one or more recipients. For example, the collaboration service 124 may output a user interface 122 accessible by a client device 102 over a network 110. The user interface 122 may be output in response to a selection of a send a link control to share a particular content item. The user interface 122 enables a user to select one or more recipients, input known contact info, and/or submit a request to send a link to the one or more recipients. The collaboration service 124 may receive and process the request to identify intended recipients. This may involve parsing the request to extract contact info for the one or more recipients.

Different one-time sharing links are generated for each of the selected recipients (block 1004). Here, the collaboration service 124 may create a different one-time link for each individual recipient. This may occur substantially in the same manner as creating distinct links for different publish targets as discussed in relation to FIGS. 4-6. For instance, links may be formatted to have a navigation path 202 and a sharing key 204 as with other links described herein. The one-time sharing links though contain information sufficient to designate the link as a one-time sharing link and/or enable the collaboration service 124 to identify and handle the links as one-time sharing links. In one approach, the sharing key 204 can be mapped to an ACL that designates the link as a one-time sharing links. Additionally the sharing key 204 or another suitable identifier contained within a link can be used to flag the link as a one-time sharing link. In any case, the collaboration service 124 is able to examine a link, determine in some manner whether the link is a one-time sharing link, and handle the link accordingly.

Once appropriate one-time sharing links are generated, the collaboration service 124 may then send notifications having a unique one-time sharing link to each designated recipients. The collaboration service 124 may send notifications through different messaging service including for example email, instant messaging, text messaging, and so forth. In some cases, the collaboration service 124 may send notifications through associated partner sites such as social networks, in which case recipient is notified through messaging functionality provided by the partner sites.

As mentioned, links designated in some manner as one-time sharing links enable recipients to get limited, one-time access to a shared item for the purpose of selecting or registering an account to use for subsequent access to the item. In this manner, recipients are able to select accounts they find most convenient for accessing a shared item without the owner/sharer of the item necessarily having contact information for those accounts or sending a link to the accounts.

To do so, an option for a recipient to select an account to use for access to the item is exposed responsive to a selection of the sharing link by the recipient (block 1006). An option to select an account may be provided in various ways and at different times. For example, an account selection user interface or dialog may be presented that enables selection of a particular account at an appropriate time during an authentication sequence. Through the dialog, a user may be prompted to select a current account, choose a different account, and/or create a new account to use for accessing the shared item. An example dialog is discussed below in relation to FIG. 13.

The timing for presenting the account selection option may be dependent upon access permissions associated with the one-time sharing link. For example, a link may be configured to require sign-in before any access to the item is provided. If this is the case, an authentication sequence that incorporates the option to select an account may be initiated right away when a link is used. On the other hand, if some level of access, such as view only access, is granted by a link, then selection of the link does not cause initiation of the authentication sequence right away. Instead, appropriate access to the item is granted and the recipient of the link may view the item. When the recipient attempts an action that requires sign-in and/or different access privileges, the authentication sequence incorporating the option to select an account may be initiated at that time. One example authentication sequence that can be employed to control access to items and account selection is discussed below in relation to FIG. 11.

Permissions on the item are associated with the selected account (block 1008) and the link is invalidated for subsequent use to gain permissions on the object (block 1010). Thus, when an option to select an account is exercised using a one-time sharing link, the selected account is granted permissions on the item. This can occur by associating the account with the item through an ACL or otherwise.

Similar to the tiered access level approach discussed above in relation to the group opt-in option, different access levels may be used in conjunction with one-time sharing links. Here, a first level of access may be associated with a one-time sharing link before the link is redeemed. For instance, an unredeemed link may be associated with initial, basic permissions for unauthenticated users that allow a user simply to view the item. Again, the initial permissions may be set by default and/or may be designated by the user. In general, the initial permissions grant limited or no access to the item. Redeeming the link by selection of an account causes permissions to change from the initial, basic permissions to enhanced permissions established for authenticated users when the link is created. For example, the enhanced permissions may be set to enable editing in addition to viewing the item. Thus, various different access levels may be associated with an item using the one-time sharing link and granted to a user of the link after redeeming the link.

Once a one-time sharing link is redeemed, the collaboration service 124 invalidates the link for subsequent access to the item. For instance, an ACL may be updated to reflect that the one-time sharing link has been redeemed. This may occur by revoking the sharing key 204 associated with the link or in another suitable manner that revokes privileges for the one-time sharing link. The one-time sharing link will no longer be valid to access the item or gain permissions to the item. Instead, permissions are now associated with the selected account, which can be used for subsequent access to the item.

Figure 11:
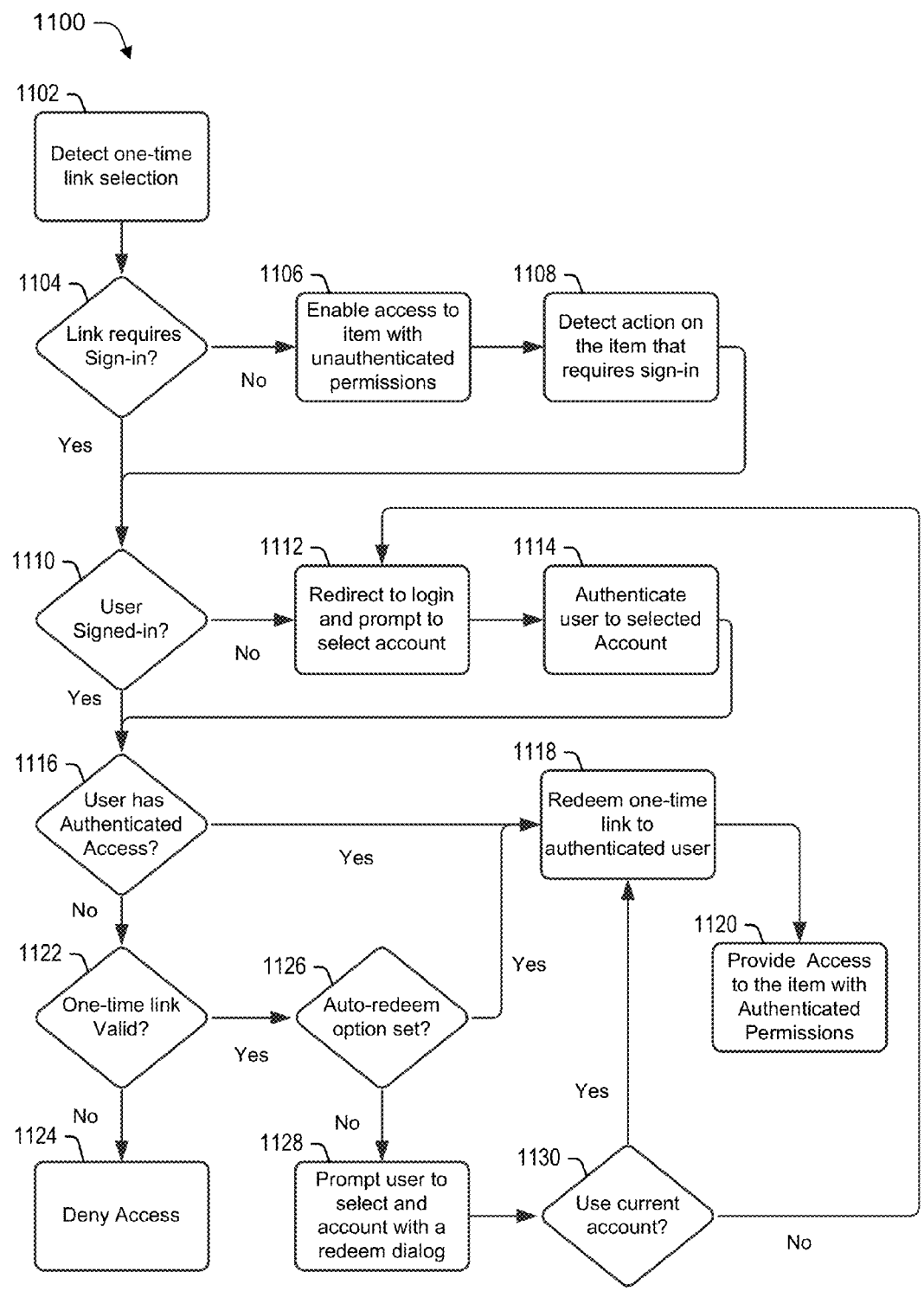
FIG. 11 is a flow diagram depicting an example procedure for an authentication sequence that may be initiated by selection of a one-time sharing link.

Consider now FIG. 11 that depicts a procedure 1100 for an authentication sequence in which one-time sharing links are employed for selection of an account in accordance with one or more embodiments. Selection of a one-time sharing link for a shared item is detected (block 1102). A determination is made regarding whether the link involves a sign-in to gain access to the shared item (block 1104). The determination may be based on tiered access levels assigned to a link as discussed earlier in this document. For example, sign-in may optionally be required by a user when a one-time sharing link for a shared item is created. Effectively, the one-time sharing link will then provide limited access for the purpose of selecting an account to use to access the corresponding shared item.

If the link does not involve a sign-in, access to the item is enabled with unauthenticated permissions (block 1106). The unauthenticated permissions represent initial, basic permissions set by default or by user selections when the one-time sharing link is created. Thereafter, the system may monitor to detect action that does involve the sign-in (block 1108). It should be noted that unauthenticated access can be disabled by forcing link redemption. In this case, the owner may designate at the time of link creation that a sharing link be redeemed before permissions are granted. Effectively, the link is configured without unauthenticated permissions and a recipient may be unable to even view an item before redeeming the associated link.

Both when the link requires sign-in per block 1104 and when action requiring sign-in is detected per block 1108, a determination is made as to whether the user is already signed-in (block 1110). If the user is not already signed-in, the user is redirected to login (block 1112) and the user is authenticated to a selected account (block 1114). This may occur through the collaboration service 124 and/or an authentication service accessible via the service provider 102 using any suitable authentication techniques. In general, the user provides credentials (e.g., username and password) to access and account which are verified to ensure that the user is who they claim to be. In at least some embodiments the user may be prompted to log-in to an account the use would like to use for access to the item at this point. In addition or alternatively, an account selection prompt may also occur later within the authentication sequence as described below.

After authenticating the user per block 1114 and also when user is already signed-in per block 1110, a determination is made as regarding whether the user already has authenticated access to the shared item (block 1116). If so, the one-time sharing link is redeemed (block 1118) and access to the shared item is provided with authenticated permissions (block 1120). In this case, an assumption may be made that the user prefers to use the current account that already has permissions on the shared item. As such, access is granted without prompting to select a different account. In an alternate approach, a switch account option may be provided to enable the user to switch accounts even if the user already has authenticated access per block 1116. However, in the depicted example access is granted through the current account already having access and if not already the case, the link is redeemed and invalidated for subsequent use.

Otherwise, if the user does not have authenticated access per block 1116, a determination of the validity of the one-time sharing link is made (block 1122). Here a check is made to ensure that the link has not been previously redeemed. If the one-time sharing link is not valid, access is denied (block 1124) and an error message may be presented indicating that the one-time sharing link is not valid to gain access to the shared item.

On the other hand, when the one-time sharing link is determined to be valid, a check is made regarding whether an optional auto-redeem option is set (block 1126). The auto-redeem option can be selectively set as a design parameter to control whether one-time sharing links are redeemed automatically or through an account selection dialog. In addition or alternatively, a configurable parameter for the auto-redeem option may be associated with items and/or user accounts. In this example, the configurable parameter may be set by an item owner and/or individually for accounts of link recipients. If the auto-redeem option is set, the flow proceeds back to blocks 1118 and 1120 where the one-time sharing link is automatically redeemed and access to the shared item is provided with authenticated permissions. This may occur without outputting a prompt to the user.

If the auto-redeem option is not set, though, an account selection dialog (e.g. redeem dialog) prompting the user to select an account is output (block 1128). Based on input obtained via the account selection dialog, a determination is made regarding whether to use the current account or select another account (block 1130). If the current account is selected, the flow again proceeds back to blocks 1118 and 1120 where the one-time sharing link is redeemed and access to the shared item is provided with authenticated permissions.

Otherwise, the flow proceeds back to block 1112 where the user is redirected to login and authentication to a different account may occur. Blocks 1112-1130 may therefore be repeated for the different account until the current account is selected at block 1130.

Figure 12:
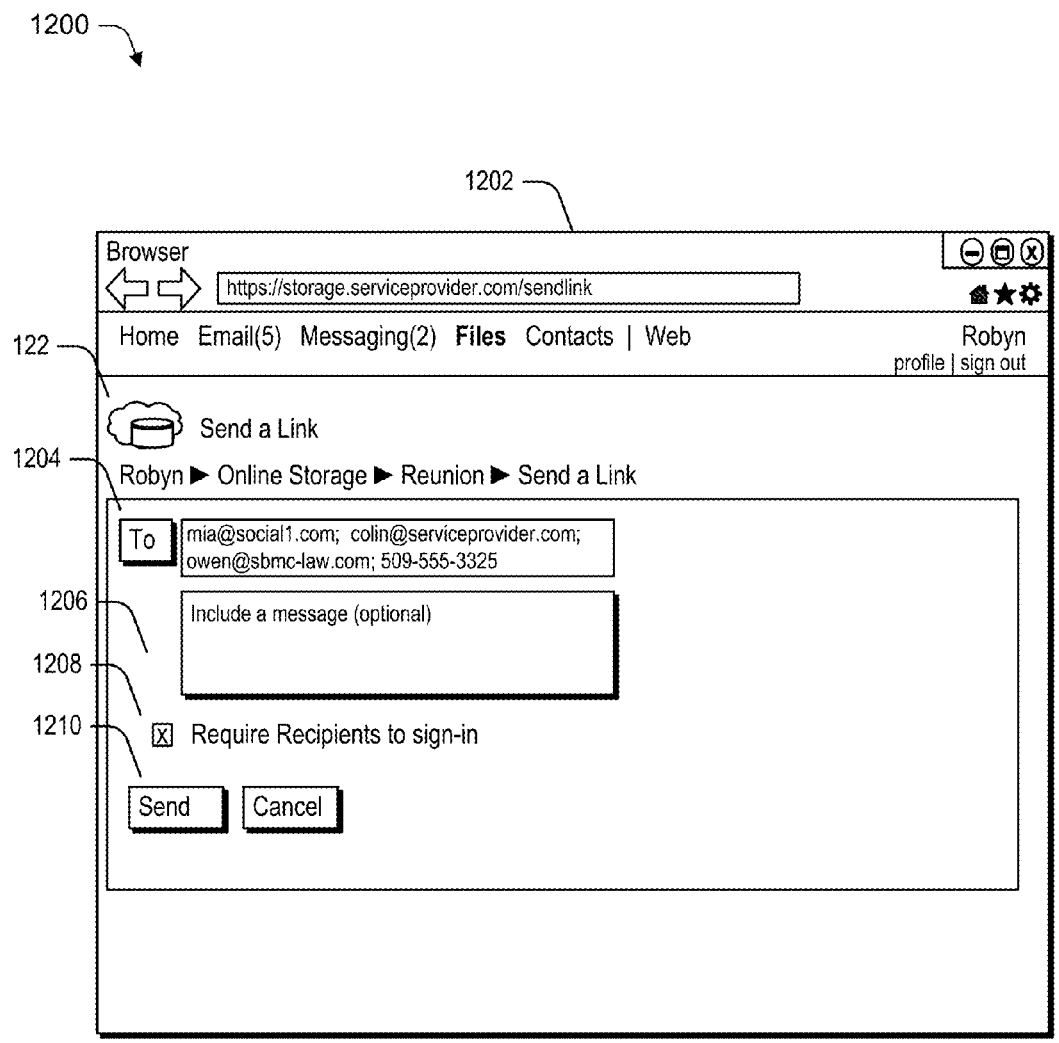
FIG. 12 depicts an example user interface for sending a sharing link to implement an option to select an account for use to access a shared item in accordance with one or more embodiments.

FIG. 12 depicts a diagram 1200 showing an example user interface 122 that can be employed to send a link to selected contacts. Once again, the user interface 122 is illustrated as incorporated within a user interface 1202 that may be provided by a communication module 116 as with the preceding examples. In at least some embodiments, the example interface depicted in FIG. 12 may be presented responsive to selection of the "Send a Link" object appearing within the sharing portion 308 in FIG. 3.

Here the example user interface 122 is again operable to provide a sharing link 128 for the "Reunion" folder of FIG. 3. In this case, the interface can be used to submit a request that causes the collaboration service 124 to create and distribute one-time sharing links for selected recipients that may be formatted, distributed, and employed as discussed previously. In particular, an address portion 1204 is depicted that may be used to input email addresses or other contact information for selected recipients. As mentioned, the sender does not necessarily have to send the link to accounts the recipients ultimately choose to access the shared item. A message portion 1206 enables the sender to optionally include a personal message along with the sharing link. Additionally, a require sign-in control 1208 is operable to selectively set whether a sign-in is involved to access the item by the recipients. When require sign-in is set, the one-time sharing links are configured to provide limited access to a shared item for the purpose of selecting an account. Otherwise a default or selected access level established for unauthenticated users may be associated with one-time sharing links created through the dialog. Although not shown in this particular example, the sender may also be able to access a permissions control or menu to designate access levels for both initial permissions before sign-in (e.g., unauthenticated permissions) and enhanced permissions after sign-in (e.g., authenticated permissions) in accordance with techniques discussed in relation to FIG. 10-11.

The example user interface 122 of FIG. 12 further includes a send control 1210. The send control 1210 is selectable to submit a request that causes the collaboration service 124 to create and distribute appropriate one-time sharing links based on the recipients selected through the user interface 122.

Figure 13:
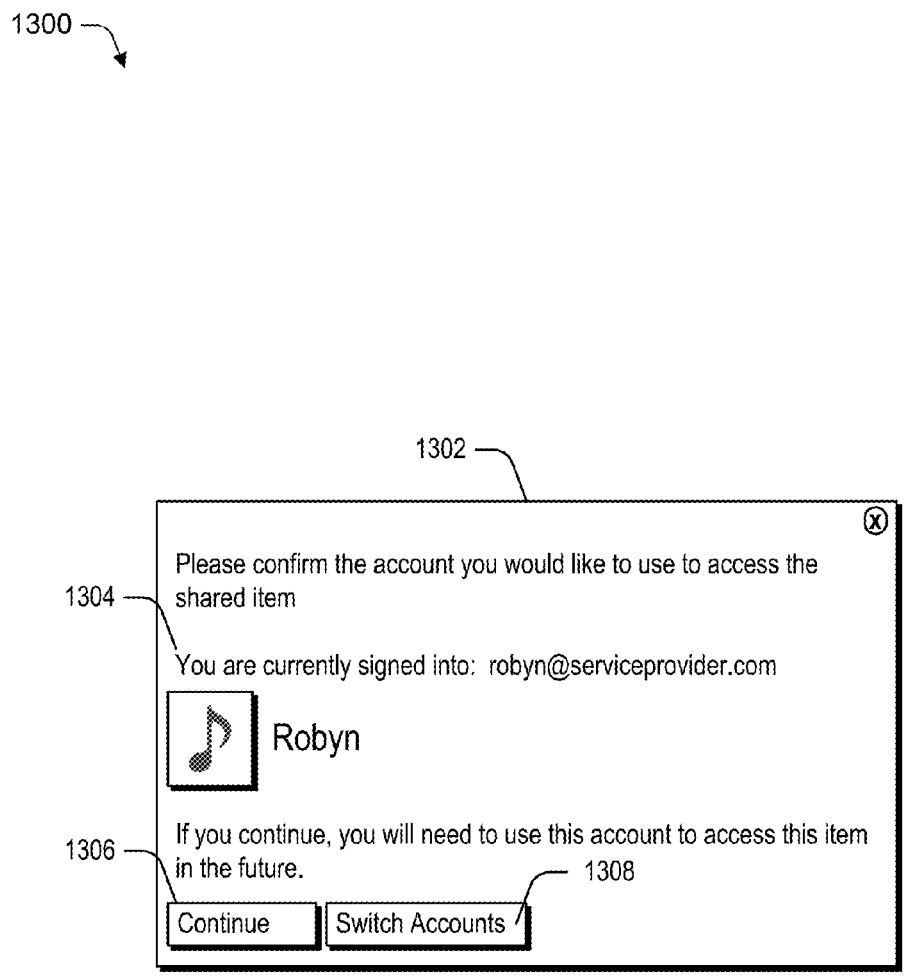
FIG. 13 depicts an example user interface for prompting a user to select an account for use to access a shared item in accordance with one or more embodiments.

FIG. 13 depicts a diagram 1300 showing an example account selection dialog 1302 in accordance with one or more embodiments. The account selection dialog 1302 may be exposed at various times within an authentication sequence as previously described to enable a user to select a particular account to use for access to a shared item when appropriate. For example, the account selection dialog 1302 may be exposed at block 1128 within the example authentication sequence described in relation to FIG. 11.

Here, the account selection dialog 1302 includes a current account indication 1304 that indicates an account to which the user is currently authenticated. The user may select a continue control 1306 provided by the dialog to use the current account for access to the corresponding shared item. If the user so chooses, the user may select a switch accounts control 1308 also provided by the dialog to select a different account. Selection of the switch accounts control 1308 causes a redirection to a log-in process to select the different account and/or provide corresponding credentials to authenticate to the account.

Having considered some example details regarding various techniques to create and use sharing links, consider now a discussion of example systems and device that may be employed to implement the various techniques in one or more embodiments.

Example System and Device

Figure 14:
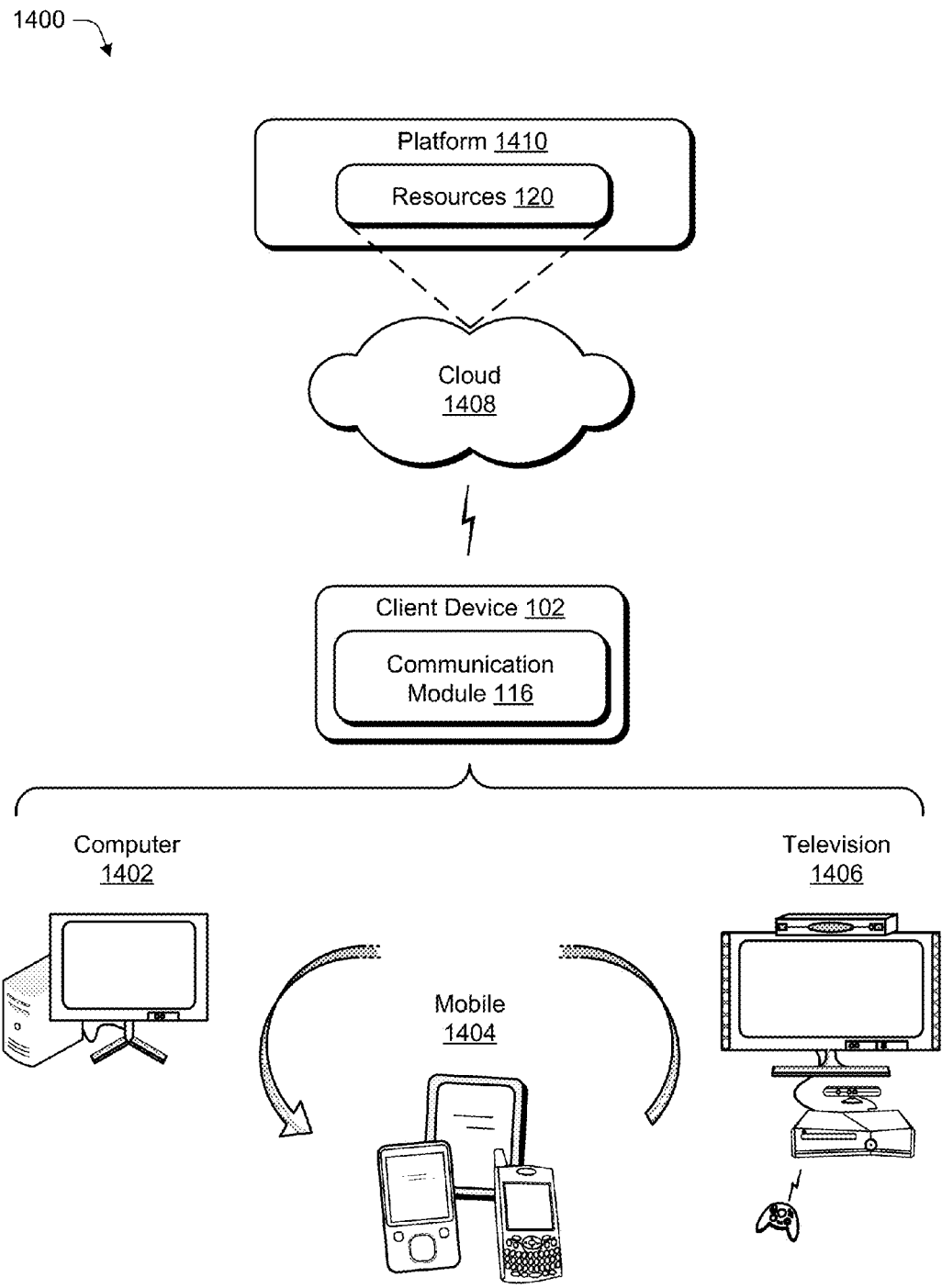
FIG. 14 depicts an example multiple device environment for online resources in accordance with one or more embodiments.

FIG. 14 illustrates an example multiple device environment 1400 that includes the computing device 102 as described with reference to FIG. 1. The example multiple device environment 1400 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example multiple device environment 1400, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 1402, mobile 1404, and television 1406 uses. Each of these configurations includes devices that may have generally different constructs and capabilities, and thus the computing device 102 may be configured according to one or more of the different device classes. For instance, the computing device 102 may be implemented as the computer 1402 class of a device that includes a personal computer, desktop computer, a multi-screen computer, laptop computer, netbook, and so on.

The computing device 102 may also be implemented as the mobile 1404 class of device that includes mobile devices, such as a mobile phone, portable music player, portable gaming device, a tablet computer, a multi-screen computer, and so on. The computing device 102 may also be implemented as the television 1406 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. This is illustrated through inclusion of the communication module 116 on the client device 102. For instance different devices may include different communication modules 116 (e.g., browsers) adapted for the particular device and through which various resources 120 of the platform 1410 can be accessed, including the collaboration service 124 and online storage 126 described herein.

The cloud 1408 includes and/or is representative of a platform 1410 for resources 120. The platform 1410 abstracts underlying functionality of hardware (e.g., servers) and software resources of the cloud 1408. The resources 120 may include applications and/or data that can be utilized while computer processing is executed on servers that are remote from the computing device 102. Resources 120 can be provided as a service over the Internet and/or through a subscriber network, such as a cellular or Wi-Fi network.

The platform 1410 may abstract resources and functions to connect the computing device 102 with other computing devices. The platform 1410 may also serve to abstract scaling of resources to provide a corresponding level of scale to encountered demand for the resources 120 that are implemented via the platform 1410. Accordingly, in an interconnected device embodiment, implementation of functionality of the functionality described herein may be distributed throughout the multiple device environment 1400. For example, the functionality may be implemented in part on the computing device 102 as well as via the platform 1410 that abstracts the functionality of the cloud 1408.

Figure 15:
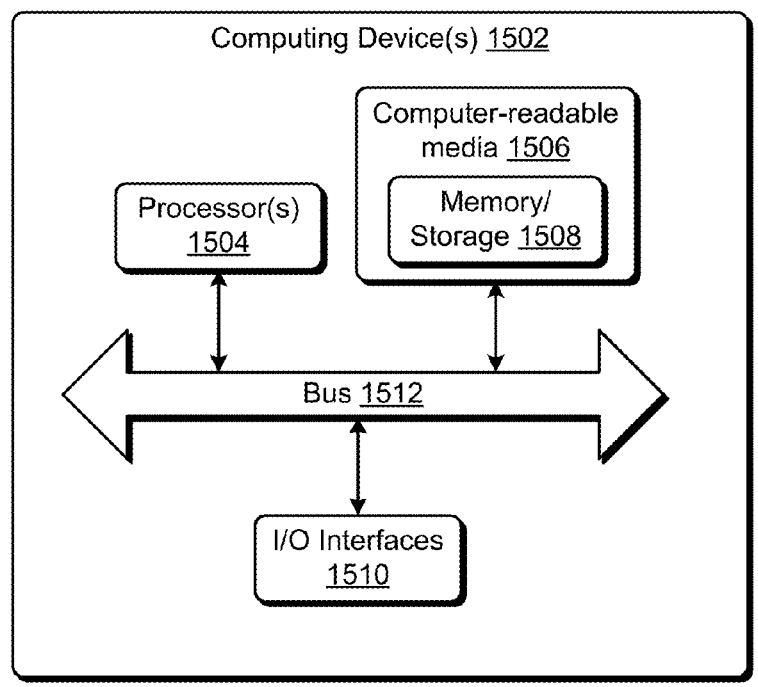
FIG. 15 depicts an example computing system in accordance with one or more embodiments.

FIG. 15 illustrates an example system generally at 1500 that includes an example computing device 1502 that is representative of one or more such computing systems and/or devices that may implement the various embodiments described above. The computing device 1502 may be, for example, a server of a service provider 106, a client device 102, a system on-chip, and/or any other suitable computing device or computing system.

The example computing device 1502 includes one or more processors 1504 or processing units, one or more computer-readable media 1506 which may include one or more memory and/or storage components 1508, one or more input/output (I/O) interfaces 1510 for input/output (I/O) devices, and a bus 1512 that allows the various components and devices to communicate one to another. Computer-readable media 1506 and/or one or more I/O devices may be included as part of, or alternatively may be coupled to, the computing device 1502. The bus 1512 represents one or more of several types of bus structures, including a memory bus or memory controller, a peripheral bus, an accelerated graphics port, and a processor or local bus using any of a variety of bus architectures. The bus 1512 may include wired and/or wireless buses.

The one or more processors 1504 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 1508 represents memory/storage capacity associated with one or more computer-readable media. The memory/storage component 1508 may include volatile media (such as random access memory (RAM)) and/or nonvolatile media (such as read only memory (ROM), Flash memory, optical disks, magnetic disks, and so forth). The memory/storage component 1508 may include fixed media (e.g., RAM, ROM, a fixed hard drive, etc.) as well as removable media (e.g., a Flash memory drive, a removable hard drive, an optical disk, and so forth).

Input/output interface(s) 1510 allow a user to enter commands and information to computing device 1502, and also allow information to be presented to the user and/or other components or devices using various input/output devices. Examples of input devices include a keyboard, a touchscreen display, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the resources 120, collaboration service 124, applications 114, communication module 116, and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 1502 may be configured to implement particular instructions and/or functions corresponding to the software and/or hardware modules implemented on computer-readable media. The instructions and/or functions may be executable/operable by one or more articles of manufacture (for example, one or more computing devices 1502 and/or processors 1504) to implement techniques related to sharing links, as well as other techniques. Such techniques include, but are not limited to, the example procedures described herein. Thus, computer-readable media may be configured to store or otherwise provide instructions that, when executed by one or more devices described herein, cause various techniques related to sharing links.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   determining, by a computing device, one or more selected recipients for a sharing link to one or more files maintained in online storage;
   generating different one-time sharing links for each of the one or more selected recipients, the one-time sharing links being valid for a first access of the one or more files to enable the one or more selected recipients to interact with the one or more files on a limited basis during the first access;
   responsive to selection of a one-time sharing link by a respective recipient, exposing as part of an access sequence initiated by the selection of the one-time sharing link an option to select a user account to use for access to the one or more files; and
   invalidating the one-time sharing link for subsequent use to interact with the one or more files, the one-time sharing link being invalidated for any access of the one or more files subsequent to the first access, the selected user account enabling the access to the one or more files subsequent to the first access.

2. A method as described in claim 1, wherein determining the selected recipients comprises:
   receiving a request to send sharing links to the selected recipients, the request including contact information for the selected recipients; and
   processing the request to identify the selected recipients based on corresponding contact information.

3. A method as described in claim 1, wherein the one-time sharing links are configured to provide limited, one-time access to the one or more files for the purpose of selecting an account to use for subsequent access to the one or more files.

4. A method as described in claim 1, wherein generating the one-time sharing links comprises encoding first-access permissions to the one or more files within the one-time sharing links, the first-access permissions controlling interactions that are permittable during the first access.

5. A method as described in claim 1, further comprising sending notifications having the one-time sharing links to the selected recipients based upon contact information for the selected recipients included in a request from a client to send sharing links to the selected recipients.

6. A method as described in claim 5, wherein the user account selected by the recipient is different than another account of the recipient corresponding to the contact information used to send the sharing link to the recipient.

7. A method as described in claim 1, further comprising granting the recipient limited access to the one or more files associated with unauthenticated users until the recipient selects the user account to gain enhanced access to the one or more files associated with authenticated users.

8. A method as described in claim 1, wherein exposing the option to select a user account comprises presenting an account selection dialog to enable selection of a particular user account during an authentication sequence.

9. A method as described in claim 1, wherein generating the one-time sharing links comprises constructing each particular one-time sharing link to include a navigation path to the one or more files and a sharing key that uniquely identifies the particular one-time sharing link.

10. A method as described in claim 1, wherein exposing the option to select a user account comprises selectively presenting the option during an authentication sequence based upon a determination of whether the recipient is currently authenticated to a current user account that has authenticated access to the shared one or more files, including:
   presenting the option when the recipient is not currently authenticated to a current user account having authenticated access to the shared one or more files; and
   automatically using the current user account as the selected account and foregoing the option when the recipient is currently authenticated to a current user account having authenticated access to the shared one or more files.

11. One or more computer-readable hardware storage devices storing instructions that, when executed by one or more components of a computing device, implement a collaboration service configured to perform operations including:
   providing online storage that is allocated to user accounts with a service provider;
   generating a one-time sharing link to share a file stored in online storage associated with a user in response to a request to get the one-time sharing link for the file;
   sending a notification having the one-time sharing link to the recipient;
   responsive to a first time that the one-time sharing link is selected by the recipient, initiating an authentication sequence to authenticate the recipient to a user account of the recipient with the service provider to gain subsequent authenticated access to the file, the one-time sharing link being valid during a first access of the file by the recipient to enable the authentication sequence to be performed during the first access and invalid for any accesses subsequent to the first access to prevent the authentication sequence from being performed again using the one-time sharing link;
   prompting the recipient to select the user account with an account selection dialog during the authentication sequence; and
   providing the recipient with the subsequent authenticated access to the file using the selected user account.

12. One or more computer-readable hardware storage devices as recited in claim 11, wherein the collaboration service is further configured to perform operations including:
   invalidating the one-time sharing link for subsequent use to interact with the file once the recipient uses the one-time sharing link to select the user account.

13. One or more computer-readable hardware storage devices as recited in claim 11, wherein the authentication sequence comprises operations including:
   determining whether the one-time sharing link indicates that a require sign-in option is set;
   responsive to a determination that the one-time sharing link indicates the require sign-in option is not set, providing the recipient with access to the file granted to unauthenticated users, detecting when actions on the file by the recipient require access granted to authenticated users, and performing the prompting in response to the detecting; and
   responsive to a determination that the one-time sharing link indicates the require sign-in option is set, providing the recipient with limited access for the purpose of selecting the user account and outputting the account selection dialog to authenticate the user to the selected account.

14. One or more computer-readable hardware storage devices as recited in claim 11, wherein the authentication sequence comprises operations including:
   determining whether the recipient already has authenticated access to the file through a current user account to which the recipient is currently logged-in;
   responsive to a determination that the current user account does have authenticated access to the file, selecting the current user account to use for subsequent access to the file; and
   responsive to a determination that the current user account does not have authenticated access to the file, prompting the recipient with the account selection dialog to select the current user account or another account to use for subsequent access to the file.

15. One or more computer-readable hardware storage devices as recited in claim 11, wherein the one-time sharing link is generated to include:
   a navigation path to the file; and
   a sharing key used to identify the one-time sharing link to the collaboration service as a one-time sharing link.

16. One or more computer-readable hardware storage devices as recited in claim 11, wherein the collaboration service is provided in conjunction with a plurality of resources available to clients over a network from the service provider.

17. A computing system comprising:
   one or more processing components;
   one or more computer-readable hardware storage devices storing instructions that, when executed by the one or more processing components, implement a collaboration service configured to perform operations including:
   generating different one-time sharing links for each of one or more recipients selected to receive a sharing link to an item controlled by a user account of the service provider and comprising at least one of a file or a file folder, the one-time sharing link configured to furnish limited access to the item when first accessed by the one or more recipients;
   sending notifications having the one-time sharing links to the one or more recipients;
   responsive to selection of a one-time sharing link by a respective recipient, selectively exposing an account selection dialog to prompt the recipient to select a user account to use subsequently for access to the item; and
   when the account selection dialog is exposed and the recipient selects a user account through the account selection dialog:
   invalidating the one-time sharing link to prevent the one-time sharing link from being used again to expose the account selection dialog; and
   enabling the recipient to subsequently access the item using the selected user account.

18. A computing system as described in claim 17, wherein the collaboration service is further configured to perform operations including:
- when it is determined that the recipient is not currently authenticated to a current user account having permission to access the item, selectively exposing the account selection dialog; and
- when it is determined that the recipient is currently authenticated to a current user account having permission to access the item, automatically selecting the current user account to use for access to the item.

19. A computing system as described in claim 17, wherein the one-time sharing link is invalidated after the recipient uses the one-time sharing link to prevent subsequent access to the item without using the selected user account.

20. A computing system as described in claim 17, wherein:
- the collaboration service is further configured to perform operations including:
- outputting a user interface configured to enable input of a request to send sharing links to the selected recipients, the request including contact information for the selected recipients; and
- receiving the request submitted via the user interface; and
- the generating comprises generating the one-time sharing links for the selected recipients ascertained from the request and the sending comprises sending the one-time sharing links to the selected recipients using the contact information included in the request.

* * * * *